(12) United States Patent
Igata

(10) Patent No.: US 6,499,030 B1
(45) Date of Patent: Dec. 24, 2002

(54) APPARATUS AND METHOD FOR INFORMATION RETRIEVAL, AND STORAGE MEDIUM STORING PROGRAM THEREFOR

(75) Inventor: Nobuyuki Igata, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,635

(22) Filed: Mar. 30, 2000

(30) Foreign Application Priority Data

Apr. 8, 1999 (JP) .......................................... 11-101109

(51) Int. Cl.$^7$ .............................................. G06F 17/30
(52) U.S. Cl. ............................................................ 707/6
(58) Field of Search ................................ 707/1, 2, 3, 4, 707/5, 6, 9, 10, 104.1, 531, 532; 395/600

(56) References Cited

U.S. PATENT DOCUMENTS

| | | | | |
|---|---|---|---|---|
| 5,377,309 A | * | 12/1994 | Sonobe et al. ................. | 706/48 |
| 5,481,700 A | * | 1/1996 | Thuraisingham ............ | 395/600 |
| 5,778,150 A | * | 7/1998 | Chan et al. ................... | 706/45 |
| 5,870,740 A | * | 2/1999 | Rose et al. .................... | 707/5 |
| 5,907,840 A | * | 5/1999 | Evans ........................... | 707/5 |
| 6,076,088 A | * | 6/2000 | Paik et al. .................... | 707/5 |
| 6,205,443 B1 | * | 3/2001 | Evans ........................... | 707/5 |
| 6,240,439 B1 | * | 5/2001 | Hasegawa et al. .......... | 709/100 |
| 6,314,410 B1 | * | 11/2001 | Tackett et al. ................ | 706/11 |

FOREIGN PATENT DOCUMENTS

| | | |
|---|---|---|
| JP | 3-130873 | 6/1991 |
| JP | 3-172966 | 7/1991 |
| JP | 6-162101 | 6/1994 |
| JP | 7-225772 | 8/1995 |
| JP | 9-153066 | 6/1997 |
| JP | 10-13407 | 1/1998 |

\* cited by examiner

*Primary Examiner*—Wayne Amsbury
*Assistant Examiner*—Hanh Thai
(74) *Attorney, Agent, or Firm*—Staas & Halsey LLP

(57) ABSTRACT

A user inputs a retrieval query represented by a set of propositions using a modal operator through an interface. The retrieval query is passed to a document set gathering unit through a retrieval input unit. The document set gathering unit refers to an index, gathers a set of documents having a true proposition, and writes it to a work area. A similarity computation unit computes the similarity of the gathered set of documents and writes it to the work area. The retrieval result output unit refers to the work area, ranks the gathered sets of documents in consideration of a true/false value and a similarity, and the ranking result to the interface as a retrieval result. A common keyword extraction unit extracts a keyword for output from the ranked sets of documents, and outputs the keyword after adding a corresponding modal operator to the keyword to the interface.

52 Claims, 9 Drawing Sheets

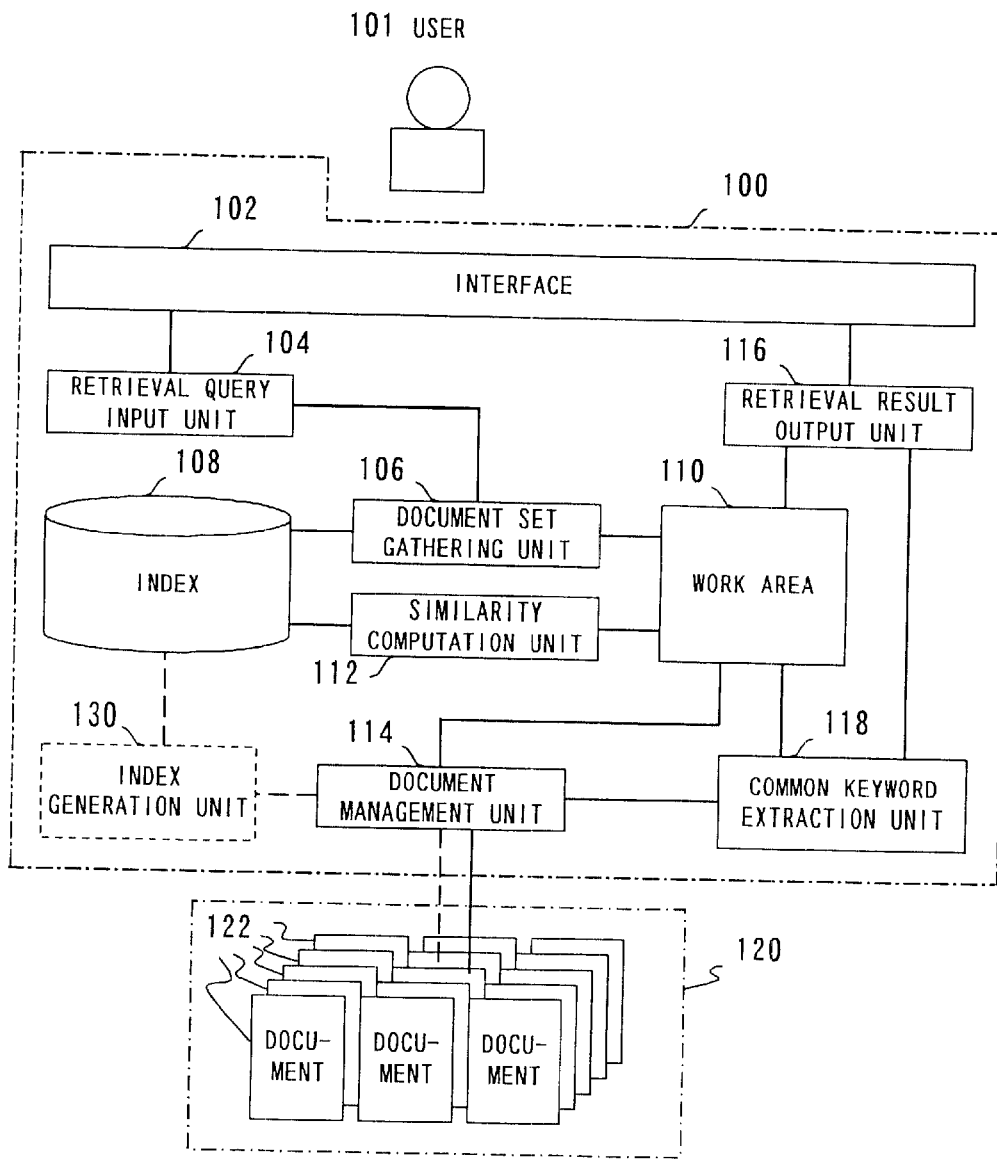
F I G. 3

| | | | | | ... | 110 |
|---|---|---|---|---|---|---|
| | | | | | ... | |
| | | | | | ... | |

INITIALIZED WORK AREA

DOCUMENT IDENTIFIER
PARTIAL SIMILARITY
TRUE/FALSE COUNTER

F I G. 5 A

| 1 | 2 | 3 | 4 | 5 | ... | 1000 |
|---|---|---|---|---|---|---|
| 5 | 10 | 3 | 2 | 12 | ... | 8 |
| 1 | 1 | 1 | 1 | 1 | ... | 1 |

WORK AREA AFTER [□ RETRIEVAL] PROCESS

DOCUMENT IDENTIFIER
PARTIAL SIMILARITY
TRUE/FALSE COUNTER

F I G. 5 B

| 1 | 3 | 5 | 7 | 9 | ... | 999 |
|---|---|---|---|---|---|---|
| 8 | 5 | 15 | 4 | 10 | ... | 4 |
| 2 | 2 | 2 | 2 | 2 | ... | 2 |

WORK AREA AFTER [□ NATURAL LANGUAGE PROCESS] PROCESS

DOCUMENT IDENTIFIER
PARTIAL SIMILARITY
TRUE/FALSE COUNTER

F I G. 5 C

| 1 | 3 | 5 | 7 | 9 | ... | 999 |
|---|---|---|---|---|---|---|
| 12 | 8 | 21 | 4 | 10 | ... | 4 |
| 3 | 3 | 3 | 2 | 2 | ... | 2 |

WORK AREA AFTER [◇ JAPANESE] PROCESS

DOCUMENT IDENTIFIER
PARTIAL SIMILARITY
TRUE/FALSE COUNTER

F I G. 5 D

| 1 | 3 | 5 | 7 | 9 | ... | 999 |
|---|---|---|---|---|---|---|
| 21 | 8 | 21 | 4 | 15 | ... | 10 |
| 3 | 3 | 3 | 2 | 2 | ... | 2 |

WORK AREA AFTER [INTERNET], [INTRANET], [PATENT RETRIEVAL], AND [THESIS RETRIEVAL] PROCESS

DOCUMENT IDENTIFIER
PARTIAL SIMILARITY
TRUE/FALSE COUNTER

F I G. 5 E

| 1 | 3 | 5 | 7 | 9 | ... | 999 |
|---|---|---|---|---|---|---|
| 12 | 5 | 21 | 4 | 11 | ... | 8 |
| 3 | 2 | 3 | 2 | 1 | ... | 1 |

WORK AREA AFTER [◇¬ MACHINE TRANSLATION] PROCESS

DOCUMENT IDENTIFIER
PARTIAL SIMILARITY
TRUE/FALSE COUNTER

F I G. 5 F

| 1 | 3 | 9 | 11 | 13 | ... | 999 |
|---|---|---|---|---|---|---|
| 12 | 5 | 11 | 25 | 18 | ... | 8 |
| 3 | 2 | 1 | 3 | 3 | ... | 1 |

WORK AREA AFTER [□¬ KANA-KANJI CONVERSION] [□¬ WORD-PROCESSOR] PROCESS

DOCUMENT IDENTIFIER
PARTIAL SIMILARITY
TRUE/FALSE COUNTER

F I G. 5 G

| 11 | 13 | 1 | ... | 3 | ... | 9 | 999 | ... |
|---|---|---|---|---|---|---|---|---|
| 25 | 18 | 12 | ... | 5 | ... | 11 | 8 | ... |
| 3 | 3 | 3 | ... | 2 | ... | 1 | 1 | ... |

WORK AREA AFTER SORTING PROCESS

DOCUMENT IDENTIFIER
PARTIAL SIMILARITY
TRUE/FALSE COUNTER

F I G. 5 H

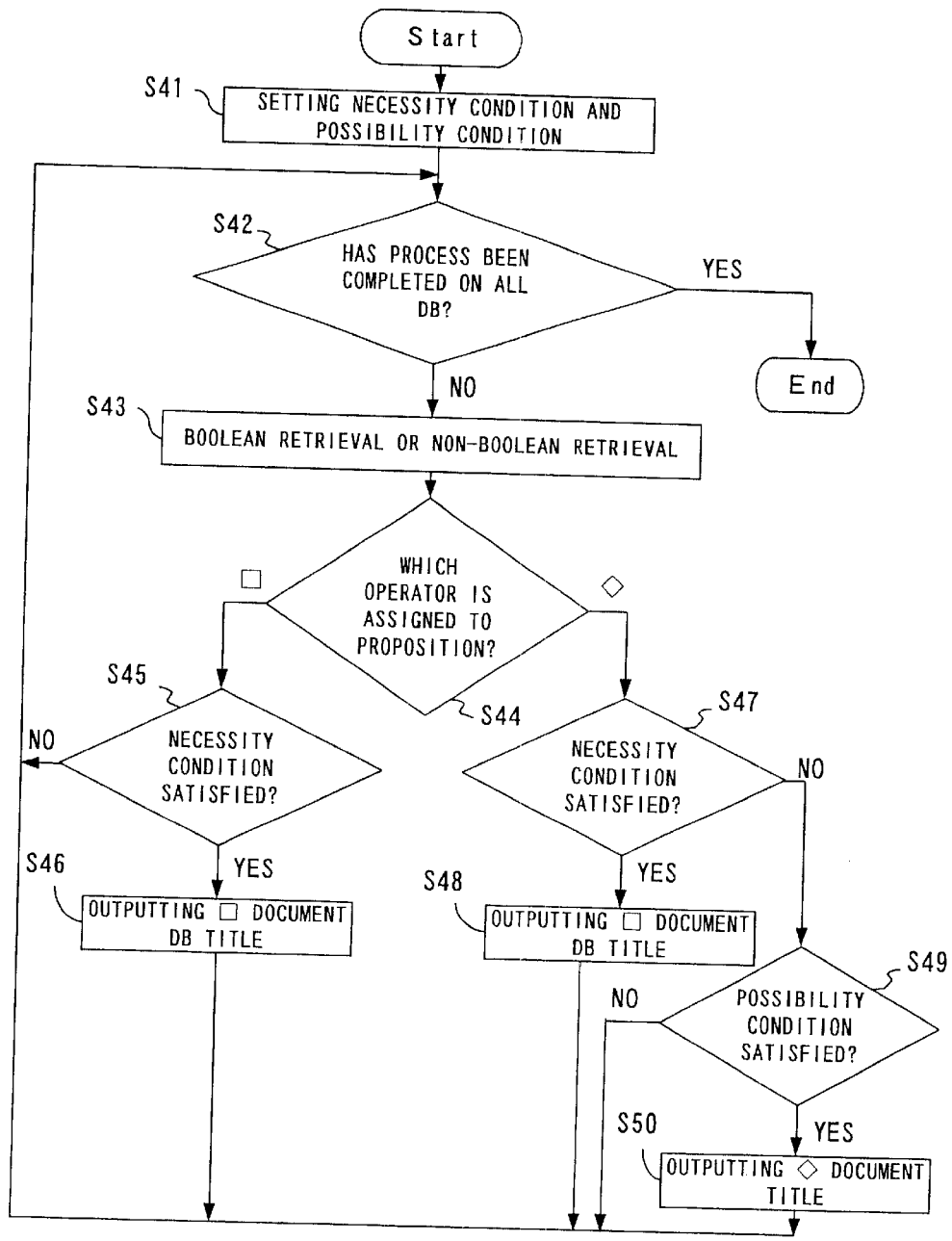
F I G. 8

APPARATUS AND METHOD FOR INFORMATION RETRIEVAL, AND STORAGE MEDIUM STORING PROGRAM THEREFOR

BACKGROUND OF THE INVENTION

1. Field of the Invention

The present invention relates to an information retrieval (IR) apparatus, IR method, and a storage medium storing a program for realizing the process.

2. Description of the Related Art

Recently, it has been more and more popular to process and store document information using electronic appliances and storage media, and it has become common to share document information among a number of users. Normally, documents can be shared using a database. The database is normally stored in an external storage device. However, the storage capacity of an external storage device has been extended year by year, and the volume of documents to be stored in the database has become enormously large.

As a system of retrieving such a database, a Boolean IR system, a non-Boolean IR system, and a combination system of the two IR systems (hereinafter referred to as a combination system) are used.

In the Boolean IR system, a document (or a set of documents) containing a keyword is defined as 'true', and a document (or a set of documents) not containing a keyword is defined as 'false', and a document (or a set of documents) whose logical expression inputted as a retrieval query is 'true' can be specified. The retrieval query can be a logical expression obtained by connecting a plurality of keywords using logical symbols such as AND, OR, NAND, etc.

The non-Boolean IR system is a user-friendly IR system aiming at allowing a common user to easily retrieve necessary data. Various methods are proposed by the non-Boolean IR system. For example, a method of retrieving data through a fuzzy IR system using a multi-value logic instead of a binary logic of 'true' or 'false' (for example, the invention disclosed by the Japanese Patent Laid-Open No. 06-162101 published by the Japanese Patent Office), a method of retrieving data in natural language text using an input device for receiving natural language text as a retrieval query not a logical expression (for example, the invention disclosed by the Japanese Patent Laid-Open No. 03-130873), and a similarity retrieval device for ranking retrieval results in the natural language text and display them (for example the invention disclosed by the Japanese Patent Laid-Open No. 03-172966) are proposed. Normal ranking retrieval is classified as a non-Boolean IR system.

As a combination system, a device for generating a logical expression for a Boolean IR system from natural language text (for example, the invention disclosed by the Japanese Patent Laid-Open No. 10-134078 published by the Japanese Patent Office) is proposed.

In addition, a method for manipulating the ranking order in a ranking IR system, a IR system which assigns a hierarchical level for a ranked document (for example, the invention disclosed by the Japanese Patent Laid-Open No. 09-153066 published by the Japanese Patent Office) is proposed. This system analyzes a syntax called 'functional unit' in a user-inputted sentence, and sets up a hierarchy for each functional unit.

However, the above described conventional IR systems and the ranking IR system have the following problems.

First, in the Boolean IR system, a retrieval query is evaluated by two values 'true' and 'false', thereby applying a strict retrieval condition to the retrieval query. Therefore, it is difficult for a user to appropriately generate a retrieval query specifying a desired document (or a set of documents). There also has been the problem that a user has to be well-trained in generating the retrieval query.

In addition, in the non-Boolean IR system and the combination system, the similarity between a retrieval query and a document is determined by a system, and a user cannot easily change the similarity. To solve the problem, a IR system (for example, the invention disclosed by the Japanese Patent Laid-Open No. 07-225772 published by the Japanese Patent Office) which is provided with a device through which a user can input the weight between keywords to reflect the intention of the user in the retrieval has also been proposed. However, the final weight of keywords is determined by the similarity computation mechanism in a IR system. As a result, there is the possibility that a retrieval result deviates from the intention of the user.

Furthermore, according to the invention disclosed by the Japanese Patent Laid-Open No. 09-153066 published by the Japanese Patent Office, there has been the problem that the functional unit of a user-inputted sentence does not always match the functional unit of a relevant document.

As described above, since a retrieval query is evaluated by two values 'true' and 'false' in the Boolean IR system, the retrieval condition is strict, and a user has to be well-trained to effectively use the IR system. In addition, to solve problem with the Boolean IR system, the non-Boolean IR system and the combination system are designed to determine the similarity between a retrieval query and a document by each system, and the user cannot easily change the ranking order of documents. Furthermore, there is the problem in the non-Boolean IR system using a natural language that the current natural language processing technology is not completed, and cannot sufficiently analyze the intention of a user only according to the information in a natural language.

The above described problems with the conventional technology can be summarized as follows.

1) Since a complicated retrieval query should be generated to appropriately perform a document retrieving process in the Boolean IR system, it takes a long time for the user to become skillful in using the system. In other words, a beginner user cannot sufficiently utilize the system, and only a skilled user can effectively use the system.

2) In a simple non-Boolean IR system, the occurrence number of a keyword determines the similarity. Therefore, there is the possibility that a document not requested by the user may change ranking order.

3) Furthermore, the non-Boolean IR system has the following problems with user-input.

1. In the retrieval query in a natural language, detailed query cannot be performed for the similarity computation mechanism. Therefore, the retrieval query cannot be performed with the intention of a user sufficiently reflected.

2. In the IR system in which the weight between keywords is specified, it is necessary for a user to fully understand a similarity computation method used in the IR system. Therefore, a common user cannot easily use the system.

It can be recognized that the system of adding the weight between keywords cannot reflect the intention of a user because the adding of the weight does not apply to the feeling of a user. That is, in the conventional system, the influence of the weight specified by a user on the similarity depends of the designer of the IR system. When the concept of the designer is different from the recognition of the user, the user cannot specify the weight of a keyword which can sufficiently reflect the intention of the user.

In addition, in a normal similarity computation mechanism, the occurrence number of a keyword is an important factor for determining the similarity. However, the mechanism is not provided with a unit for determining whose similarity is higher, a document containing a larger number of types of keywords, or a document containing a frequently occurring keyword. However, the intention of a user determines which is prioritized between the above described two documents. Therefore, which between the above described two documents is prioritized depends on each retrieval query and each keyword, but there are no IR systems designed in consideration of this point.

SUMMARY OF THE INVENTION

The present invention aims at providing an IR system capable of describing data as correctly as the Boolean IR system without obtaining the knowledge about a complicated logical expression or knowing the designing concept of the IR system, and of easily reflecting the intention of a user in a ranking result.

Described below is each aspect of the present invention. According to the present invention, the word 'a set of documents' refers to plural documents, and can refer to a single document. That is, an element of a set of documents is a document. A set of documents is a set of a single or a plurality of documents. A set can be empty, but an empty set of documents indicates that no documents corresponding to a retrieval query can be found in a document database when a document database is searched.

The information retrieval device according to the first aspect of the present invention is based on the information retrieval device for retrieving a document corresponding to a user-inputted retrieval query from a document database, and includes each of the following units.

An input unit is used to input a retrieval query represented by a proposition to which a modal operator used in a modal logic is added.

A document set gathering unit searches a document database, and gathers a set of documents having the proposition of the retrieval query as 'true'.

A similarity computation unit computes the similarity of the gathered set of documents.

A retrieval result output unit hierarchically ranks the set of documents corresponding to the inputted retrieval query according to the result of the gathering by the document set gathering unit and the result of the computation by the similarity computation unit, and outputs the ranking result.

In the information retrieval device according to the first aspect of the present invention, a modal operator which is used in a modal logic is included in the description of a retrieval query to reflect the intention of a user in the retrieval query. In addition, a retrieval query can be more easily generated using a modal operator than a retrieval query in the Boolean IR system, and the load of the user required in generating a retrieval query can be successfully reduced. In addition, using a modal operator, the user can specify the weight for a keyword based on his or her own feeling. Therefore, the user can represent his or her intention in a retrieval query, and the system can obtain the intention of the user through the retrieval query.

Furthermore, a modal operator includes a necessity symbol for assignment of the necessity concept 'true in the entire world' to a proposition, and a possibility symbol for assignment of the possibility concept 'true in a certain world' to a proposition. The user limits a set of documents to be obtained as a retrieval result using a necessity symbol, and greatly affects the ranking order using a possibility symbol.

In addition, in response to the proposition in the inputted retrieval query, the retrieval result output unit determines the position of the set of documents in the hierarchy based on the numbers of true propositions and false propositions as an evaluation reference so that each set of documents obtained by the retrieval can be hierarchically ranked and presented to the user.

Furthermore, the retrieval result output unit ranks plural sets of documents positioned in the same hierarchy in order from higher in similarity so that the sets of documents can be further ranked in each hierarchy and presented to the user. In this case, the similarity corresponds to the occurrence number of a keyword gathered in a retrieval query.

In the information retrieval device according to the second aspect of the present invention further includes, in addition to each unit in the above described information retrieval device according to the first aspect of the present invention, a common keyword extraction unit for extracting a common keyword in each document in each set of documents ranked by the retrieval result output unit.

With the configuration, the information retrieval device according to the second aspect of the present invention can extract a keyword commonly contained in all documents obtained through the retrieval, a keyword commonly contained in all documents ranking high, a keyword commonly contained in all documents ranking low, etc. through the common keyword extraction unit regardless of the keyword contained in the user-inputted retrieval query.

In addition, the retrieval result output unit can add a necessity symbol to and output a keyword commonly contained in all documents, add a possibility symbol to and output a keyword commonly contained in all documents of ranking higher order, and add a possibility symbol and a negation operator to and output a keyword commonly contained in all documents of ranking lower order. Thus, the user can compare and check the user-inputted keyword with the keyword output from the system, and can select a candidate for a keyword to be next inputted.

The information retrieval device according to the third aspect of the present invention is based on the information retrieval device for retrieving a document database corresponding to a retrieval query inputted by the user from a plurality of document databases, and includes the following units.

An input unit is used to input a retrieval query represented by a proposition to which a modal operator used in a modal logic is added.

A document set gathering unit searches a document database, and gathers a set of documents having the proposition of the retrieval query as 'true'.

A necessity/possibility condition discrimination unit discriminates a document database satisfying a condition prescribed by a modal operator added to the proposition based on the gathering result obtained from the document set gathering unit.

In the information retrieval device according to the third aspect of the present invention, a modal operator for use in the above described modal logic is introduced to the retrieval query for use in retrieving a plurality of document databases. Therefore, a document database for special use by the user, or a relevant document database not for special use can be discriminated. The database for special use can be a document database satisfying, for example, the necessity condition that the proposition is true in all stored documents. The relevant database not for special use can be a document database satisfying, for example, the possibility condition that the proposition is true in at least one of the stored documents.

The information retrieval device according to the fourth aspect of the present invention includes, in addition to the units contained in the information retrieval device according to the third aspect of the present invention, a retrieval result output unit for adding a modal operator to and outputting the name of the document database discriminated as satisfying the above described condition by the necessity/possibility condition discrimination unit.

Therefore, in the information retrieval device according to the fourth aspect of the present invention, a user can be informed of a database for special use by the user by adding a necessity symbol to and outputting the name of the document database. Furthermore, the user can be informed of a useful relevant database not for special use by the user by adding a possibility symbol to and outputting the name of the document database.

An IR method according to the fifth aspect of the present invention includes the following steps (a) thorough (d) based on the IR method for retrieving a document corresponding to a user-inputted retrieval query from a document database.

(a) inputting a retrieval query represented by a proposition to which a modal operator for use in a modal logic is added:

(b) searching a document database, and gathering a set of documents containing the proposition of the retrieval query as 'true';

(c) computing the similarity of the gathered set of documents;

(d) hierarchically ranking and outputting the set of documents corresponding to the inputted retrieval query based on the gathering result of the document set and the computation result of the similarity.

The IR method according to the fifth aspect of the present invention has an operation and an effect similar to those of the information retrieval device according to the first aspect of the present invention.

The IR method according to the sixth aspect of the present invention is based on the IR method for retrieving a document corresponding to a user-inputted retrieval query from a document database, and includes, in addition to the above described steps (a) through (d) of the IR method according to the fifth aspect of the present invention, a step (e) of extracting a common keyword in each document of each set of documents ranked in the above described step (d).

The IR method according to the sixth aspect of the present invention has an operation and an effect similar to those of the information retrieval device according to the second aspect of the present invention.

The IR method according to the seventh aspect of the present invention is based on the IR method for retrieving a document database corresponding to a user inputted retrieval query, and includes the following steps (a) through (c).

(a) inputting a retrieval query represented by a proposition to which a modal operator for use in a modal logic is added;

(b) searching a plurality of document databases, and gathering a document database containing the proposition of the retrieval query as 'true'; and (c) discriminating a document database satisfying a condition prescribed by the modal operator added to the proposition based on the gathering result obtained in the step (b).

The IR method according to the seventh aspect of the present invention has an operation and an effect similar to those of the information retrieval device according to the third aspect of the present invention.

The IR method according to the eighth aspect of the present invention includes, in addition to the above described steps (a) thorough (c) according to the IR method according to the seventh aspect of the present invention, a step (d) of adding a modal operator to and outputting the name of the document database discriminated as satisfying the above described condition in the step (c).

The IR method according to the eighth aspect of the present invention has an operation and an effect similar to those of the information retrieval device according to the fourth aspect of the present invention.

The computer-readable storage medium according to the ninth aspect of the present invention stores a program for directing a computer to perform the process including the steps of:

(a) inputting a retrieval query represented by a proposition to which a modal operator for use in a modal logic is added;

(b) searching a document database, and gathering a set of documents containing the proposition of the retrieval query as 'true';

(c) computing the similarity of the gathered set of documents;

(d) hierarchically ranking and outputting the set of documents corresponding to the inputted retrieval query based on the gathering result of the set of documents and the computation result of the similarity.

The storage medium according to the ninth aspect of the present invention stores a program for realizing by a computer an operation and an effect similar to those of the information retrieval device according to the first aspect of the present invention.

The storage medium according to the tenth aspect of the present invention stores a program for directing the computer to perform, in addition to the process containing the above described steps (a) through (d) of the program stored in the storage medium according to the ninth aspect of the present invention, the step (e) of extracting a keyword common in each document in each set of documents ranked in the above described step (d).

The storage medium according to the tenth aspect of the present invention stores a program for realizing by a computer an operation and an effect similar to those of the information retrieval device according to the second aspect of the present invention.

The storage medium according to the eleventh aspect of the present invention stores a program for directing a computer to perform the process including the steps of:

(a) inputting a retrieval query represented by a proposition to which a modal operator for use in a modal logic is added;

(b) searching a plurality of document databases, and gathering a document database containing the proposition of the retrieval query as 'true'; and (c) discriminating a document database satisfying a condition prescribed by the modal operator added to the proposition based on the gathering result obtained in the step (b).

The storage medium according to the eleventh aspect of the present invention stores a program for realizing by a computer an operation and an effect similar to those of the information retrieval device according to the third aspect of the present invention.

The storage medium according to the twelfth aspect of the present invention stores a program for directing the computer to perform, in addition to the process containing the above described steps (a) through (c) of the program stored in the storage medium according to the eleventh aspect of the present invention, the step (d) of adding a necessity symbol to and outputting the name of the document database discriminated as satisfying the above described condition in the step (c).

The storage medium according to the twelfth aspect of the present invention stores a program for realizing by a computer an operation and an effect similar to those of the information retrieval device according to the fourth aspect of the present invention.

BRIEF DESCRIPTION OF THE DRAWINGS

FIG. 3 is a block diagram of the configuration of the system of the information retrieval device according to the first embodiment of the present invention;

FIGS. 5A, 5B, 5C, 5D, 5E, 5F, 5G, and 5H show practical examples of the time transition of the contents of the work area in the process according to the flowchart shown in FIG. 4;

FIG. 8 is a flowchart showing the process of retrieving a plurality of document databases performed by the above described plural document database retrieval device.

DESCRIPTION OF THE PREFERRED EMBODIMENTS

Figures 1A, 1B:
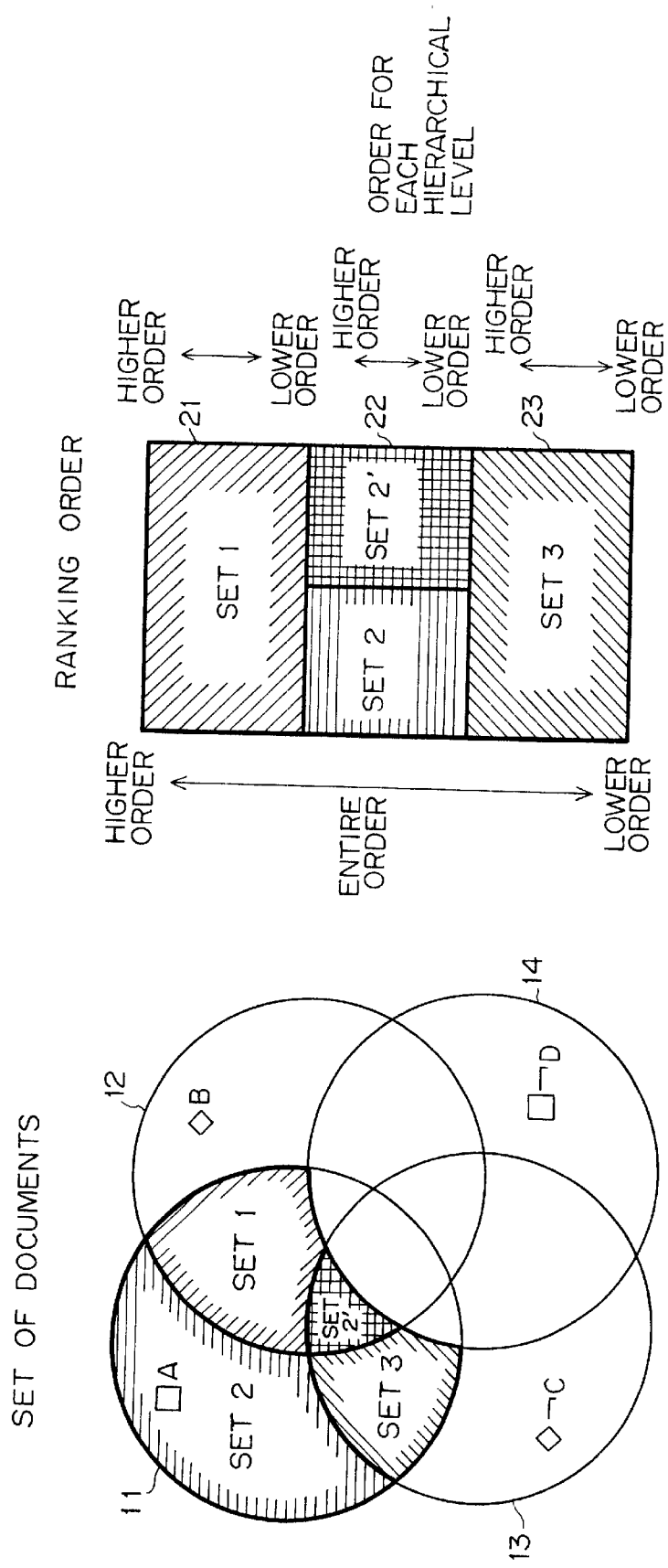
FIGS. 1A and 1B are Venn diagrams showing the relationship between a document group containing a keyword assigned a necessity symbol and a possibility symbol, and a ranking order.

The embodiments of the present invention are described below by referring to the attached drawings.

First, the principle of the embodiments of the present invention are described below.

In the IR system, the keyword in the retrieval query can be replaced with the proposition 'containing the keyword'. At this time, it is assumed that a document containing a keyword has the value of 'true', and a document not containing a keyword has the value of 'false'. In the Boolean IR system, propositions are connected with each other using such logic operators as AND, OR, NOT, etc., and a document (or a set of documents) having a logical expression represented by the connection as true is used as a retrieval result.

On the other hand, in the non-Boolean IR system, a retrieval query is given by a set of propositions, the propositions are represented not by two values of 'true' and 'false', but by multiple values, the similarity between the retrieval query and the documents is computed, and the documents are arranged in order from higher in similarity.

Introduction of Modal Operator

The present invention newly introduces a modal operator in representing a retrieval query. Described below is a modal logic using the modal operator.

The modal logic is obtained by extending a classical logic. In addition to the modal logic, a temporal logic and an epistemic logic are available. The classical logic uses two values 'true' and 'false'.

The modal logic is a logic system using a modal operator as the extension of the classical logic. The word 'modal logic' refers to a logic system obtained by introducing the two modal operators, that is, a necessity operator '□' and a possibility operator '◇', to the classical logic (in the narrow sense). Otherwise, the temporal logic, the epistemic logic, etc. can be used to refer to general logic systems using modal operators (in the broad sense).

In the modal logic in the narrow sense, the concept of the possible world is introduced, and the true/false value of a proposition A is relatively interpreted among the sets in the possible world. For example, using the following two modal operators '□' and '◇', the concepts of the necessity and the possibility are described. That is, for example, the proposition A can be defined as follows:

□A: A is true in all worlds, and

◇A: A is true in any world.

The 'world' in the modal logic is assumed to have a certain relationship with the real world, and the relationship is referred to as an accessibility relation. That is, in the modal logic, it is determined whether a proposition is 'true in all worlds' or 'true in any world' in all possible worlds accessible from the real world in the accessibility relation.

In the embodiment of the present invention, □ is defined as a necessity operator, and ◇ as a possibility operator in the modal logic. It is assumed that these operators have the following meanings (concepts).

□: true in all worlds.

◇: true in any world.

Then, assuming that a 'retrieval result' is a 'set of accessible possible worlds' and a 'one document in the retrieval result' is a 'one possible world', the following meanings 1 through 4 are assigned to the retrieval of a keyword using the necessity operator El and possibility operator ◇ of the modal operators, and the negation operator ¬.

1□ keyword: All documents in the retrieval results contain keywords.

2. ◇ keyword: A certain document in the retrieval results contain keywords.

3. ◇¬ keyword: Any document in the retrieval results contains no keywords. 4. ◇¬ keyword: A certain document in the retrieval results contains no keywords.

In the embodiment of the present invention, a set of propositions assigned the above described four operators 1 through 4 is received as a retrieval query, and documents are arranged in order (sorted) from a document containing more true propositions and less false propositions. Thus, like the conventional non-Boolean IR system, the retrieval result is displayed in a ranking order. When a plurality of documents have the equal number of true and false propositions, the similarity is computed based on the occurrence number of keywords. That is, the similarity is computed at multiple stages using the modal logic in addition to the normal similarity computation.

Since the necessity of the modal logic is the proposition 'true in all worlds', the accessible possible world, that is, the set of documents obtained as a retrieval result, can be limited by using the necessity operator □. That is, the necessity operator □ has the same effect as the 'AND' of the conventional Boolean IR system.

FIGS. 1A and 1B shows the relationship between a document set group containing respective keywords and the ranking order of each set of documents.

A circle 11 shown in FIG. 1A shows a set of documents containing a keyword 'A'. A circle 12 shows a set of documents containing a keyword 'B'. A circle 13 shows a set of documents containing a keyword 'C'. A circle 14 shows a set of documents containing a keyword 'D'. The portion encompassed by bold curves shows the retrieval result when the retrieval query containing the four propositions '□A', '◊B', '◊¬C', and '□¬D' is assigned to the set of documents containing the keywords 'A', 'B', 'C', and 'D' as indicated by the circles 11 through 14.

In FIG. 1A, a set 1 is a set of documents in which all propositions of '□A', '566 B', '◊¬C', and '□¬D' are true. A set 2 is a set of documents in which the propositions '□A', '◊¬C', and '□¬D' are true, but the proposition '◊B' is false. A set 2' is a set of documents in which the propositions '□A', '◊B', and '□¬D' are true, but the proposition '◊C' is false. A set 3 is a set of documents in which the propositions '□A' and '◊¬D' are true, but the propositions '◊B' and '□¬C' are false.

According to the embodiment of the present invention, sets of documents are ranked in order from a set containing more true propositions and less false propositions. As described above, the set 1 contains four true propositions, and zero false propositions (the true/false value is 4). The sets 2 and 2' each contain three true propositions, and one false proposition (the true/false value is 2). The set 3 contains two true propositions and two false propositions (the true/false value is 0). The word 'true/false value' in the present embodiment is used in ranking document sets. If the number of true propositions is p and the number of false propositions is n when a set of documents is searched, then the true/false value equals (p−n). That is, according to the present embodiment, a true/false value refers to the value obtained by subtracting the number of false propositions from the number of true propositions. The method of computing the true/false value is not limited to this application, but another value can be assigned to the true and false propositions. For example, V1 can be assigned to a true proposition, and V2 can be assigned to a false proposition (V1 and V2 are, for example, optional integers). In this case, for example, it can be assumed that V1 is a positive integer, V2 is a negative integer, and the absolute value of V1 is larger than the absolute value of V2. It can also be assumed that V1 and V2 are both positive integers, and V1 is larger than V2. Furthermore, various other methods can be available.

As a result, in the case shown in FIG. 1A, the set 1 ranks top at the hierarchical level 21, the sets 2 and 2' rank second at the next hierarchical level 22, and the set 3 ranks lowest at the hierarchical level 23 as shown in FIG. 1B.

Thus, since the sets 2 and 2' are equal in the number of true propositions and the number of false propositions, they are ranked at the same hierarchical level. In this case, it is possible to further rank a plurality of sets at the same hierarchical level based on the occurrence number of keywords (or the similarity).

Correspondence Between User Feeling and Modal Operator

According to the embodiment of the present invention, a modal operator is associated with the feeling of a user.

The feeling of a user for a keyword can be:

1. A keyword is so important that the user desires it to be necessarily contained in all retrieved documents.

2. A keyword indicates a higher similarity when it is once contained although not contained in all retrieved documents.

3. A keyword indicates a higher similarity when it is contained two or more times although not contained in all retrieved documents.

4. A keyword can be contained in a retrieved document, but indicates a lower similarity when it is contained two or more times.

5. A keyword can be contained in a retrieved document, but indicates a lower similarity when it is once contained.

6. A keyword is unnecessary, and not requested to be contained in any retrieved document.

According to the embodiment of the present invention, the above described six feelings can be represented by the following methods 1' through 5' using a modal operator (in the method 3' below, no modal operators are used).

1'. A necessity operator '□' is added to a keyword to be necessarily contained in a document to indicate that all retrieved documents contains the keyword.

2'. A possibility operator '◊' is added to a keyword indicating a higher similarity when once contained in any retrieved document to indicate that a retrieved document contains the keyword.

3'. Nothing, that is, no modal operator, is added to a keyword indicating a higher or lower similarity when it appears two or more times. In this case, a positive weight is assigned when the keyword indicates a higher similarity, and a negative weight is assigned when the keyword indicates a lower similarity. Thus, the keyword is independent of a true/false value in the modal logic, and has an influence only on the normal similarity computation.

4'. A possibility operator '◊' and a negation operator '¬' are added to a keyword indicating a lower similarity when it once appears to represent none of the retrieved documents contain the keyword.

5'. A necessity operator '□' and a negation operator '¬' are added to a keyword not requested to appear in any document to indicate that none of the retrieved documents contain the keyword.

According to the embodiment of the present invention, a necessity operator □ limits retrieved sets of documents, and a possibility operator ◊ greatly affects the ranking order. According to the embodiment of the present invention, the user can specify the modal operators freely for each keyword. Therefore, a IR system comprising a unit, not contained in the conventional technology, for determining whether the similarity of a document containing a larger number of types of keyword is higher or the similarity of a document containing a larger occurrence number of a specified keyword is higher can be realized according to the embodiment of the present invention.

Display of Retrieval Result

Since the feature of a modal operator resides in that it clearly indicates the hierarchical order of ranked documents as shown in FIGS. 1A and 1B, the modal operator can be used in displaying a retrieval result. That is, a keyword common in all retrieval results, a keyword common in documents ranking higher, a keyword common in documents ranking lower, etc. are extracted from actually ranked documents. The extracted keywords are displayed with modal operators indicating necessity or possibility so that the user can visually confirm the difference between his or her intention and the result returned from the IR system. Various perception output modes such as printout, voice, etc. can be used in addition to the display.

Figures 2A, 2B:
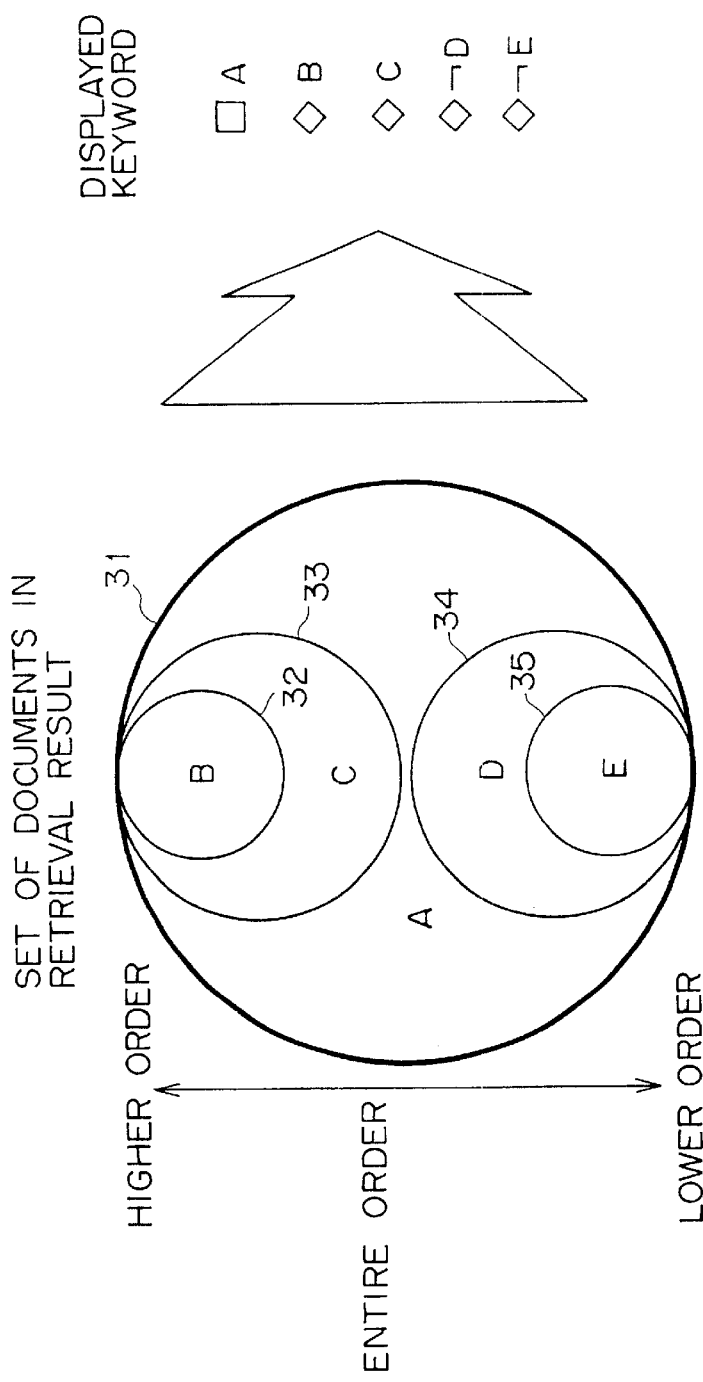
FIGS. 2A and 2B show the relationship between the keyword extracted from an actual ranking result and a modal operator.

FIGS. 2A and 2B show the method of displaying the above described retrieval results. FIGS. 2A and 2B show the case in which a keyword is extracted from a retrieval result, and the extracted keyword is displayed after assigned a necessity operator □ or a possibility operator ◊.

The outermost circle 31 in a bold line shown in FIG. 2A shows a retrieved set of documents. The inner circles 32 through 35 in thin lines within the outermost circle 31 are a set of documents containing the keywords 'B', 'C', 'D', and 'E'. In FIG. 2A, an upper portion within the bold circle 31 is a document ranking higher while a lower portion within the bold circle 31 is a document ranking lower.

Therefore, in FIG. 2A, the keyword 'A' are contained in all retrieved documents, the keywords 'B' and 'C' are contained only in the documents ranking higher, and the keywords 'D' and 'E' are contained only in the documents ranking lower.

When the above described retrieval result is obtained, a necessity operator □ is added to the keyword 'A', a possibility operator ◊ is added to each of the keywords 'B' and 'C', and a possibility operator ◊ and a negation operator ¬ are added to each of the keywords 'D' and 'E' when they are displayed as shown in FIG. 2B according to the embodiment of the present invention.

In this case, an extracted keyword is extracted regardless of a keyword inputted by a user. Therefore, the user checks a display result, and compares the keyword inputted by the user with the keyword assigned a modal operator corresponding to the actual ranking result obtained by the system. Through the comparison, the user can recognize a candidate for a keyword to be inputted next.

In the above described explanation, examples of propositions each containing only one keyword have been described for simple explanation. However, it is assumed that, in a proposition, a modal operator can be added also to a logical expression represented by AND and OR as well as to a keyword.

FIG. 3 is a block diagram of the configuration of the system of an information retrieval apparatus 100 for retrieving a database based on the above described principle.

An interface 102 is a man-machine interface for inputting a retrieval query from a user 101, and outputting a retrieval result, etc. to the user 101. The interface 102 comprises, for example, a display device, and an input device such as a keyboard, a mouse, etc.

A retrieval query input unit 104 receives a retrieval query inputted from the user 101 through the interface 102. The retrieval query is assigned as a set of propositions. The retrieval query input unit 104 outputs the received retrieval query to a document set gathering unit 106.

The document set gathering unit 106 analyzes the retrieval query received from the retrieval query input unit 104, and specifies a set of documents satisfying the set of propositions in the retrieval query by referring to an index 108. Then, the specified set of documents is written to a work area 110. The work area 110 is provided in, for example, memory such as RAM, etc.

The index 108 is information such as a keyword, etc. generated by an index generation unit 130, and contained in each document 122 in a document database 120. The index 108 contains information about the name, the identifier (document identifier), etc. of each document 122. Thus, before the user 101 uses the index 108, it is generated and stored for retrieval at a higher speed.

The index generation unit 130 generates the index 108 by searching the document database 120 through a document management unit 114. In FIG. 3, the index generation unit 130 is shown as a rectangle in broken lines to indicate that the index generation unit 130 is activated before the user 101 searches the document database 120.

The document management unit 114 can be a database management system (DBMS), etc., manages the document database 120, enters/removes the document 122 in the document database 120, searches each document 122 in the document database 120 at a request from a client (for example, the index generation unit 130, a common keyword extraction unit 118, etc.), and returns the retrieval result to the client.

The document database 120 is a database storing a plurality of documents 122, and is managed by the document management unit 114.

The similarity computation unit 112 computes the similarity of each document contained in the set of documents stored in the work area 110 and written by the document set gathering unit 106 by referring to the index 108, and writes the similarity of each document to the work area 110.

The similarity computation unit 112 computes the similarity of a set of documents (computes the similarity of each document contained in the set of documents) simultaneously when the document set gathering unit 106 writes the set of documents to the work area 110.

According to the present embodiment, for example, the identifier of the document (document identifier), not an entity of a specified document, is written to the work area 110 so that the process can be performed at a higher speed and the storage capacity of the work area 110 can be reduced. Thus, the cache memory can be used in the work area 110.

A retrieval result output unit 116 sorts the documents contained in the set of documents stored in the work area 110 in order from a higher true/false value and a higher similarity by referring to the true/false value and the similarity stored in the work area 110, The common keyword extraction unit 118 extracts a keyword for output from the set of documents containing the sorted documents stored in the work area 110, and outputs the extracted keyword to the retrieval result output unit 116.

The common keyword extraction unit 118 requests the document management unit 114 to access the document 122 in the document database 120 when the outputting keyword is extracted, receives the access result from the document management unit 114, and extracts the outputting keyword based on the access result.

When the retrieval result output unit 116 receives an outputting keyword from the common keyword extraction unit 118, it outputs the outputting keyword to the interface 102.

When the interface 102 receives the sort result and the outputting keyword from the retrieval result output unit 116, it outputs a keyword commonly contained in the ranking retrieval result and a ranked document in a format perceivable by the user 101 according to the input information. At this time, the common keyword is displayed after being assigned a corresponding modal operator.

Described below is the operation of the information retrieval apparatus 100 shown in FIG. 3.

For example, assume that "the natural language processing technology in retrieving technology is demanded", "especially, it is requested to know how a natural language process on Japanese is used in a retrieval field", "information through Internet or Intranet (patent retrieval service and thesis retrieval service) is acceptable", "the retrieving technology is mainly demanded, and software information mainly about machine translation is not required", and "the information about the technology relating to a word-processor for Kana-Kanji conversion is unnecessary". The above described retrieval request from the user 101 can be represented as a proposition using a modal logic as follows.

1. The keywords to be necessarily contained are:
   □ retrieval, and □ natural language process.
2. The keyword indicating a higher similarity when it once appears is
   ◇ Japanese.
3. The keywords indicating a higher similarity when it appears two or more times are:
   Internet, Intranet, patent retrieval, and thesis retrieval.
4. The keyword indicating a lower similarity when it once appears is
   ◊⌐ machine translation.
5. The keywords not to be contained are: □⌐ Kana-Kanji conversion, and □⌐ word-processor.

The operations of the information retrieval apparatus 100 shown in FIG. 3 are described below by referring to FIGS. 4 through 6 in which it is assumed that the retrieval query containing each of the propositions in 1 through 5 above is inputted by the user 101 through the interface 102.

Figure 4:
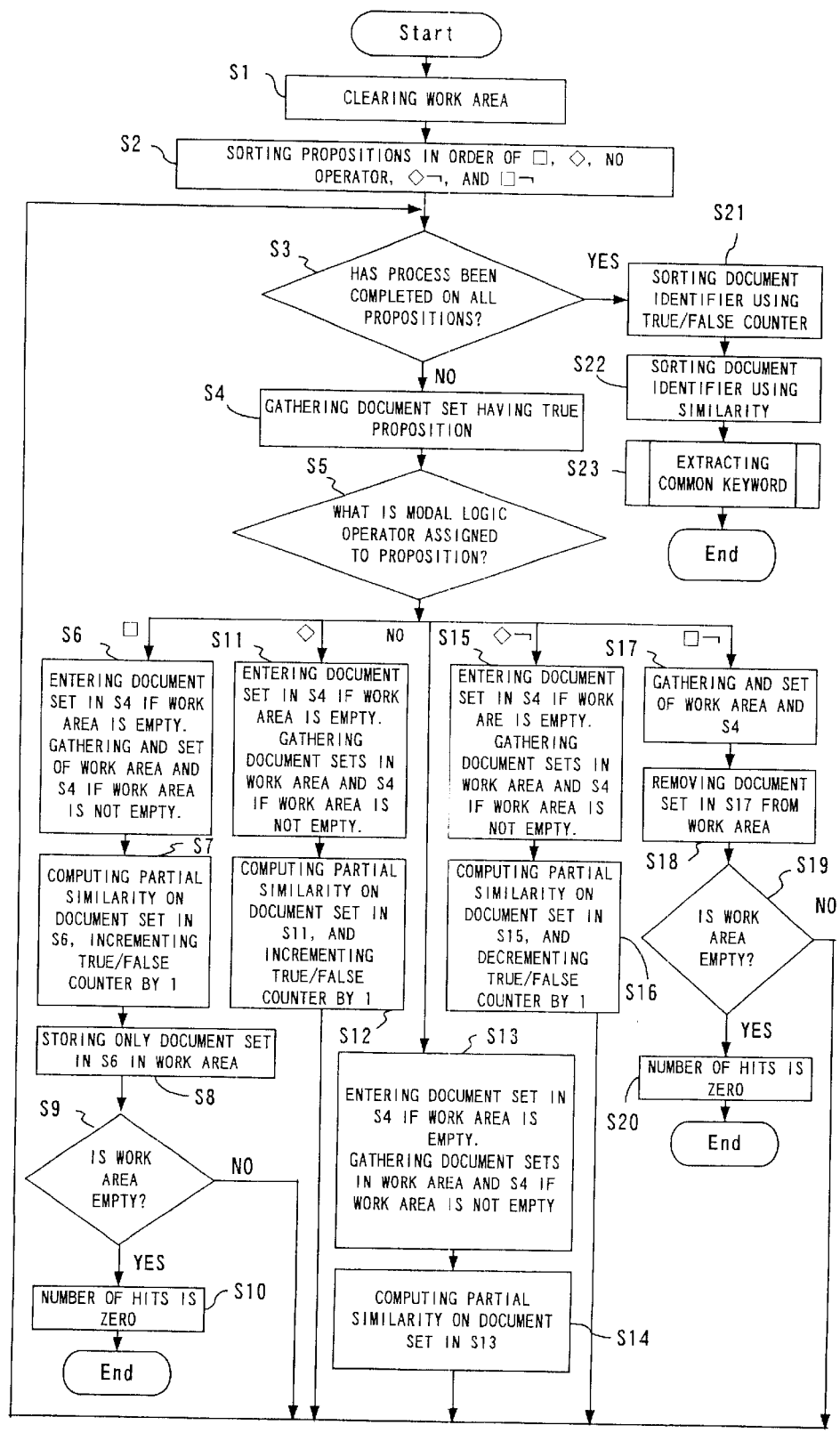
FIG. 4 is a flowchart of the entire operation of the important part of the above described information retrieval device according to the present invention.

FIG. 4 is a flowchart of the entire operations relating to the important unit of the information retrieval apparatus 100 according to the present invention. FIG. 5 shows the process of the work area 110 according to the process of the flowchart shown in FIG. 4. FIG. 6 is a flowchart of the details of the process in step S23 in the flowchart shown in FIG. 4.

The basic algorithm and the system of computing the similarity according to the flowchart shown in FIG. 4 are similar to those of the ranking process disclosed by the Japanese Patent Laid-Open No. 10-230470 previously filed by the Applicant of the present invention. However, the present invention is different from the previous invention in the process of sorting propositions using a modal operator, the process of setting a true/false counter, the process of sorting document identifiers using a true/false counter value, etc. The true/false counter is used to count the above described true/false value.

In the algorithm shown in FIG. 4, the work area 110 stores a set of three pieces of information, that is, a document identifier, a similarity (partial similarity), and a true/false counter, for a document.

As disclosed by the invention of the Japanese Patent Laid-Open No. 10-230470, when a method of computing the similarity through the common relationship among the true propositions is adopted without the true/false counter, a hierarchy indicating correct ranking levels as shown in FIG. 1B cannot be obtained, but the storage capacity used by the work area 110 can be reduced. In this case, the work area 110 stores a set of two pieces of information, that is, document identifier and similarity (partial similarity) for a document. The similarity computation unit 112 computes the similarity (partial similarity) according to the method disclosed by the invention of the above described Japanese Patent Laid-Open No. 10-230470 and other evaluation function, etc.

The operations of the information retrieval apparatus 100 are described below by referring to FIG. 4. First, the work area 110 is initialized as shown in FIG. 5A (step S1). Then, the retrieval query is set by sorting a set of propositions 1 through 5 above depending on the types of modal operators. In the retrieval query, they are sorted in the order of: □ retrieval, □ natural language process, ◇ Japanese, Internet, Intranet, patent retrieval, thesis retrieval, ◊⌐ machine translation, □⌐ Kana-Kanji conversion, and □⌐ word-processor.

Then, it is determined whether or not a process has been completed on all propositions in the retrieval query (step S3). If the process has not been completed (NO in step S3), then the proposition at the highest sorting order is selected from among the sorted propositions, and a set of documents having a true proposition is specified (step S4). In this case, according to the above described sorting result, a set of documents containing a true proposition '□ retrieval' and a keyword 'retrieval' is specified.

Then, it is determined what modal operator is assigned to the specified proposition (step S5). If the modal operator is '□', control is passed to step S6. If the modal operator is '◇', control is passed to step S11. If no operators are added, control is passed to step S13. If the modal operator is '□⌐', control is passed to step S15. If the modal operator is '□⌐', control is passed to step S17. Since the proposition '□ retrieval' is specified in this case, it is determined that the modal operator is '□', and control is passed to the process in step S6.

In step S6, the set of documents specified in step S4 is entered in the work area 110 if the work area 110 is empty. If the work area 110 is not empty, then the AND set of the set of documents stored in the work area 110 and the set of documents specified in step S4 is specified.

At this time, since the work area 110 is initialized and empty, a set of documents containing a keyword 'retrieval' is entered in the work area 110. In this case, if only the documents having the document identifiers 1 through 1000 contain the 'retrieval', the work area 110 stores a set of documents containing the documents having the document identifiers 1 through 1000 as shown in FIG. 5B.

Then the partial similarity is computed for each of the documents in the set of documents obtained in step S6, and the value of the true/false counter for each document is incremented by 1 (step S7). As a result, as shown in FIG. 5B, the document identifiers 1 through 1000, and the partial similarity of each document having each of the document identifiers are set in the work area 110. Simultaneously, the true/false counter of each document is set to 1.

Then, only the set of documents obtained in step S6 (in this case, the document identifier of each document contained in the set of documents) is stored in the work area 110 (step S8). In this case, the contents of the work area 110 are not changed. The contents of the work area 110 are as shown in FIG. 5B.

Then, it is determined whether or not the work area 110 is empty (step S9). When the work area 110 is empty (YES in step S9), it is assumed that the number of hits is zero (0) (step S10), thereby terminating the process. If it is not empty (NO in step S9), then control is returned to step S3.

In this case, since the work area 110 is not empty, the determination in step S9 is NO, thereby returning control back to step S3.

Since the processes have not been completed on all propositions in step S3, the determination in step S3 is NO. In step S4, the proposition '□ natural language process' is selected, and the set of documents containing the true proposition and the keyword 'natural language process' is specified. Then, in step S5, it is determined that the modal operator assigned to the proposition is '□', and control is passed to step S6.

In this case, if the documents having the odd-number document identifiers in the documents having the document identifiers 1 through 1000 contain 'natural language process', the set of documents containing the documents having the odd-number document identifiers are obtained as an AND set from the documents having the document identifiers 1 through 1000.

Next, in step S7, the partial similarity of each document having an odd-number document identifier is computed, and the true/false counter value of each document is incremented by 1. Then, in step S8, the AND set obtained in step S6, that is, only the set of documents containing the documents having odd-number document identifiers 1 through 1000 are left in the work area 110.

As a result, the contents of the work area 110 are as shown in FIG. 5C. That is, the work area 110 stores only the odd-number document identifiers (identifiers 1, 3, 5, . . . , 999) in the document identifiers 1 through 1000, and the value of the true/false counter corresponding to each document identifier is set to 2. In addition, the partial similarity of a document having the document identifier is increased.

Then, the determination in step S9 is NO, and control is returned to step S3. The processes in and after step S3 are performed on each of the propositions 2 through 6 above. That is, the processes in and after step S3 are performed on '◇ Japanese', 'Internet', 'Intranet', 'patent retrieval', 'thesis retrieval', '◇⌐ machine translation', '□⌐ Kana-Kanji conversion', '□⌐ word-processor' in this order. In this case, in the processes in steps S3 through S5, the processes in steps S3 and S4 are common among all of the above described propositions, and only the results of step S5 are different depending on the modal operators assigned to the respective propositions.

The process performed on each of the above described propositions is described below in the order selected in step S4.

In step S4, when the proposition '◇ Japanese' is selected, then it is determined in step S5 that the modal operator assigned to the proposition is '◇', and control is passed to step S11. The process in step S22 is similar to the above described process in step S6, and a set (AND set) contained in both set of documents stored in the work area 110 and set of documents containing 'Japanese' specified in step S4 is specified when the work area 110 is not empty.

In this case, if it is assumed that 'Japanese' is contained only in the documents having the document identifiers containing one of 1 through 5 in the lowest order digit, then a document having a document identifier containing one of 1 through 5 in the lowest order digit is specified from among the documents having the document identifiers stored in the work area 110 shown in FIG. 5C in step S11. Then, the partial similarity is computed for each of the specified document, and the value of the true/false counter of each document is incremented by 1 (step S12), thereby returning control to step S3. In this case, there are no document identifiers to be removed from the work area 110.

As a result, as shown in FIG. 5D, the partial similaritys of the document identifiers 1, 3, and 5 are increased in the work area 110, the true/false counter is incremented by 1, and the value of the true/false counter is set to 3. Control is returned to step S3. In step S4, the propositions 'Internet', 'Intranet', 'patent retrieval', and 'thesis retrieval' are selected in this order. In step S5, it is determined that there are no modal operators assigned to the propositions (no operators). Then, the processes in steps S13 and S14 are performed in order.

The process in step S13 is similar to that in step S11. In this case, if a document containing any of the 'Internet', 'Intranet', 'patent retrieval', and 'thesis retrieval' has a document identifier containing either 1 or 9 in the lowest order digit, then the partial similarity of the document having the document identifier containing either 1 or 9 in the lowest order digit among the document identifiers stored in the work area 110 shown in FIG. 5D is computed in step S13. At this time, the true/false counter of the document is not updated.

As a result, as shown in FIG. 5E, only the document identifier containing either 1 or 9 in the lowest digit among the document identifiers stored in the work area 110 is increased in partial similarity. Also in this case, there are no document identifiers to be removed from the work area 110.

After completing the process in step S13, control is returned to step S3. Then, the proposition '◇⌐ machine translation' is selected in step S4. In step S5, it is determined that the modal operator assigned to the proposition is '◇⌐', and control is passed to step S15. The process in step S15 is similar to the above described process in step S11, and an AND set of the set of documents specified in step S4 and the set of documents stored in the work area 110 is obtained.

In this case, if the document containing the 'machine translation' has a multiple of 3 as a document identifier, then the document containing a multiple of 3 as a document identifier is contained in the AND set among the documents whose document identifiers are stored in the work area 110 shown in FIG. 5E. That is, the document contains a document identifier of 3, 9, . . . , 999.

After step S15, the partial similarity of each of the documents contained in the AND set is computed, and the value of the true/false counter is decremented by 1 (step S16).

As a result, the contents of the work area 110 is as shown in FIG. 5F, the partial similarity of each document having a document identifier of 3, 9, . . . , 999 is decreased, and the value of the true/false counter of each document is decremented by 1.

After completing the process in step S16, control is returned to step S3. Then, in step S4, the proposition '□⌐ Kana/Kanji conversion' is selected. In step S5, it is determined that the modal operator assigned to the proposition is , '□⌐' and control is passed to step S17. In step S17, an AND set of a set of documents specified in step S4 and a set of documents whose document identifiers are stored in the work area 110 is obtained. In this case, an AND set of a set of documents containing 1 □⌐ Kana-Kanji conversion' and a set of documents whose document identifiers are stored in the work area 110 are obtained.

When a document containing the 'Kana-Kanji conversion' has a multiple of 5 as a document identifier, the AND set contains documents whose document identifiers are 5, 15, . . . , 995, etc. in the documents whose document identifiers are entered in the work area 110 shown in FIG. 5F.

Next, the set of documents contained in the AND set specified in step S17 is removed from the work area 110

(step S18). As a result, as shown in FIG. 5G, the document identifiers 5, 15, . . . , 995 are removed from the work area 110.

Then, it is determined whether or not the work area 110 is empty (step S19). If it is empty (YES in step S19), it is assumed that the number of hits is zero (0) (step S20), thereby terminating the process. If it is not empty (NO in step S19), then control is returned to step S3.

In step S4, the proposition '☐⌐ m word-processor' is selected, and a process similar to that of the above described proposition '☐⌐ Kana-Kanji conversion' is performed on the proposition. That is, it is determined in step S5 that the modal operator assigned to the proposition is '☐⌐', and the processes in steps S17 and S18 are performed.

In this case, if it is assumed that the document containing '☐⌐ word-processor' is a document having a multiple of 7 as a document identifier, then a set of documents having a document identifier such as 7, 21, etc. entered in the work area 110 shown in FIG. 5F can be obtained as an AND set in step S17. Then, in step S18, the AND set is removed from the work area 110. As a result, the contents of the work area 110 are as shown in FIG. 5G.

Then, it is determined in step S19 that the work area 110 is not empty in step S19, and control is returned to step S3 again. In step S3, it is determined that the process has been completed on all propositions (YES in step S3), and control is passed to step S21.

In step S21, the document identifiers are sorted in order from the largest true/false counter value by referring to the true/false counter in the work area 110. Then, the sorted document identifiers are sorted in order from the highest partial similarity by referring to the partial similarity of the document identifier in the work area 110 (step S22).

As a result, the contents of the work area 110 are as shown is FIG. 5H, and the retrieved documents are ranked according to their document identifiers. After obtaining the final ranking order, the common keyword extraction unit 118 extracts a keyword common in the set of documents obtained as a retrieval result (step S23), thereby terminating the process.

For example, in the above described retrieval result, if 'morpheme analysis' is contained in all documents obtained as a retrieval result, 'N-gram division' is contained in documents ranking higher, and 'cursor movement' is contained in documents ranking lower, then the common keywords 'morpheme analysis', 'N-gram division', and 'cursor movement' are displayed with the above described retrieval result after being provided with the respective operators '☐ morpheme', '◇ N-gram division', and '◇⌐ cursor movement'.

Next, the process of extracting a common keyword in step S23 shown in FIG. 4 is described below by referring to the flowchart shown in FIG. 6.

Figure 6:
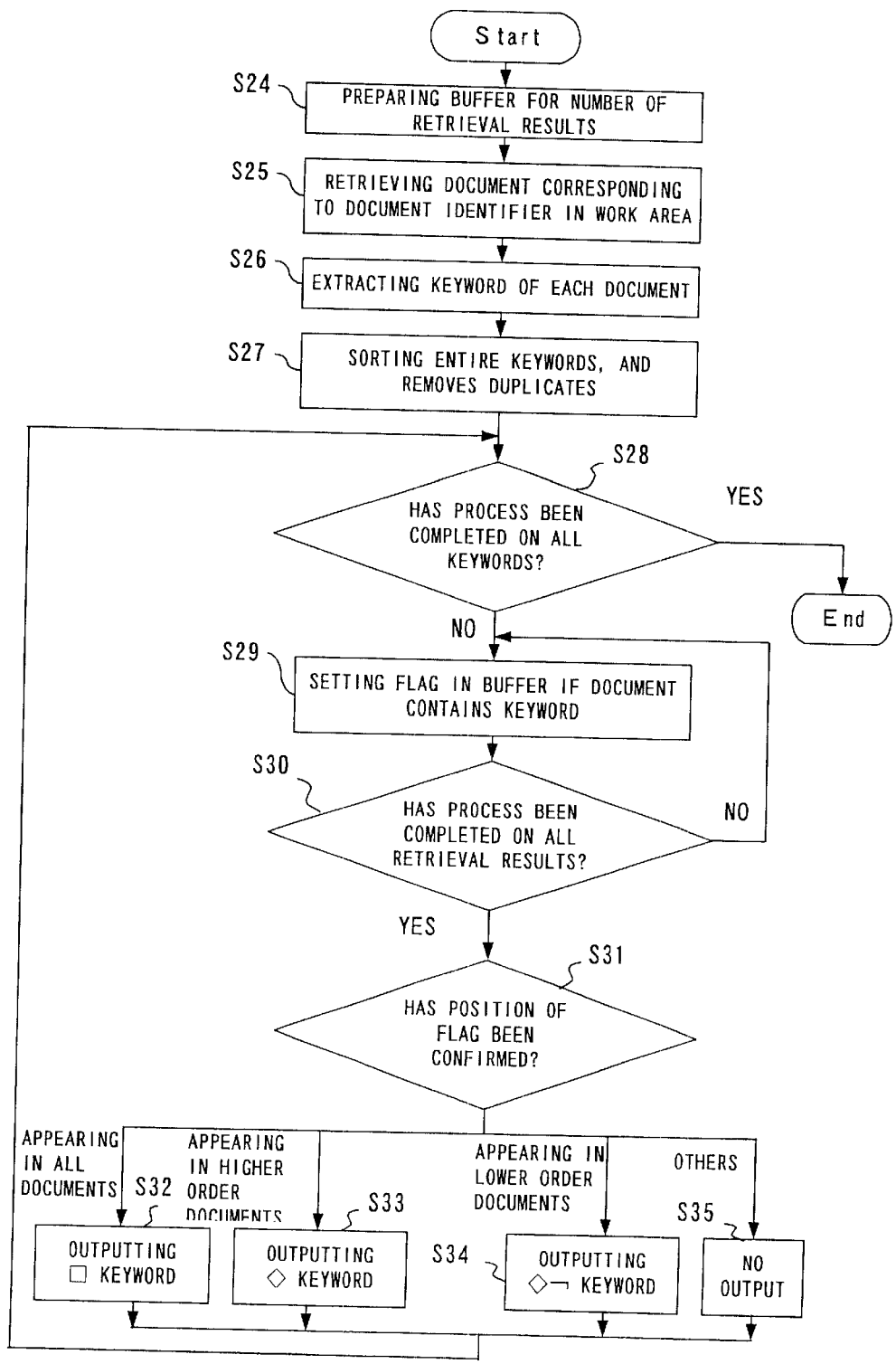
FIG. 6 is a flowchart of the details of the common keyword extracting process according to the flowchart shown in FIG. 4.

FIG. 6 is a flowchart of the process of the common keyword extraction unit 118.

The common keyword extraction unit 118 first refers to the retrieval result (document identifier) stored in the work area 110, and prepares a buffer in the work area 110 for the number of documents obtained through the retrieval (step S24). Then, the document corresponding to the document identifier set in the work area 110 is retrieved from the document database 120 through the document management unit 114, and is stored in the work area 110 or another memory area (not shown in the drawings) (step S25).

Then, the keyword of each of the retrieved documents is extracted (step S26). Next, all keywords extracted in step S26 are sorted according to a predetermined rule, and duplicate keywords are removed from the sorting result (step S27).

Then, keywords are retrieved one by one in the sorting order from the sorted keywords obtained in step S27. At this time, it is determined whether or not the process has been completed on all keywords, that is, whether or not there are keyword to be retrieved from the sorting result (step S28).

If the keywords have been retrieved, that is, the process has not been completed on all keywords (NO in step S28), then control is passed to step S29. If the process has been completed on all keywords (YES in step S28), then the process terminates.

In step S29, one retrieval result (one document) is fetched from all retrieval results, and it is checked whether the keywords retrieved in step S28 are contained in the document. If the document contains the keyword, then a flag is set for the buffer corresponding to the document (step S29). In step S29, for example, the documents are checked whether or not the keyword is contained in order from a document ranking higher.

Then, it is determined in step S28 whether or not the process has been completed on all retrieval results for the retrieved keywords. That is, it is determined whether or not the retrieving process for checking whether or not the keyword is contained has been completed on all retrieval results (all documents obtained from the retrieval by a retrieval query) retrieved in step S25 (step S30).

If the process has not been completed on all retrieval results (No in step S30), then control is returned to step S29, and the next retrieval result (document) is fetched.

As described above, the processes in steps S29 through S30 are repeated. If it is determined that all retrieval results have been retrieved on the keywords retrieved in step S28 (YES in step S30), then the position of the flag set in the process in step S29 is confirmed (step S31). If the flag appears in the entire set of the documents obtained in the retrieving process performed by the retrieval query, control is passed to step S32. If the flag appears in the documents ranking higher, control is passed to step S33. If the flag appears in the documents ranking lower, control is passed to step S34. If the flag does not refer to above described appearance states, control is passed to step S35.

In step S32, the keyword retrieved in step S28 is output in the form of '☐ keyword'. In step S33, the keyword is output in the form of ' ◇ keyword'. In step S34, the keyword is output in the form of '◇⌐ keyword'. In step S35, the keyword is not output.

When the processes in steps S32, S33, S34, or S35 have been completed, then control is returned to step S28. In step S28, the next keyword is retrieved from the sorting result obtained in step S27, and the processes in steps S29 through 35 are performed on the keyword.

Thus, any of the processes in steps S32, S33, S34, and S35 is performed on the keyword retrieved from the ranked documents. If the keyword is contained in the entire set of retrieved documents (all documents obtained in the retrieving process), '☐ keyword' is output. If the keyword is contained in the documents ranking higher in the set of documents, ' ◇ keyword' is output. If the keyword is contained in the documents ranking lower in the set of documents, '◇⌐ keyword' is output.

As described above, when the retrieval result is 10 displayed, a keyword is extracted from the ranked documents, and a keyword commonly appearing in each of the entire set of the retrieved documents, the documents ranking higher, and the documents ranking lower. The buffer prepared in step S24 shown in the flowchart in FIG. 6 is used only for a flag, it can be a 1-bit buffer for one document retrieved by the retrieval query. In addition, the process can be performed at a high speed by limiting the number of keyword extracted in step S26.

Searching a Plurality of Document Database (document DB)

The concept of the above described modal operators can be used not only in the ranking IR system in which a relevant document is retrieved from one document database, but also in the document database IR system in which a relevant document database is retrieved from a plurality of document databases.

That is, in each of the document databases, a proposition can indicate the following meanings (concepts) 1 thorough 4 using modal operators including a necessity operator □, a possibility operator ◇, and a negation operator ¬ by defining a 'document relating to a retrieval query' as a 'set of a possible world' and a 'document in a document database' as a 'possible world'.

1. □ proposition: a document database containing true propositions in all documents
2. ◇ proposition: a document database containing a true proposition in a certain document
3. □¬ proposition: a document database containing false propositions in all documents
4. ◇¬ proposition: a document database containing a false proposition in a certain document That is, for example, the document database containing a true '□ proposition' is a specialty database in the field of the proposition. The document database containing a false '□ proposition' and a true '◇ proposition' is not a specialty database, but contains a relevant database.

Thus, using modal operators in the document database IR system, a specialty document database in a field, a document database which is not a specialty database, but a relevant document database, etc. can be retrieved.

Figure 7:
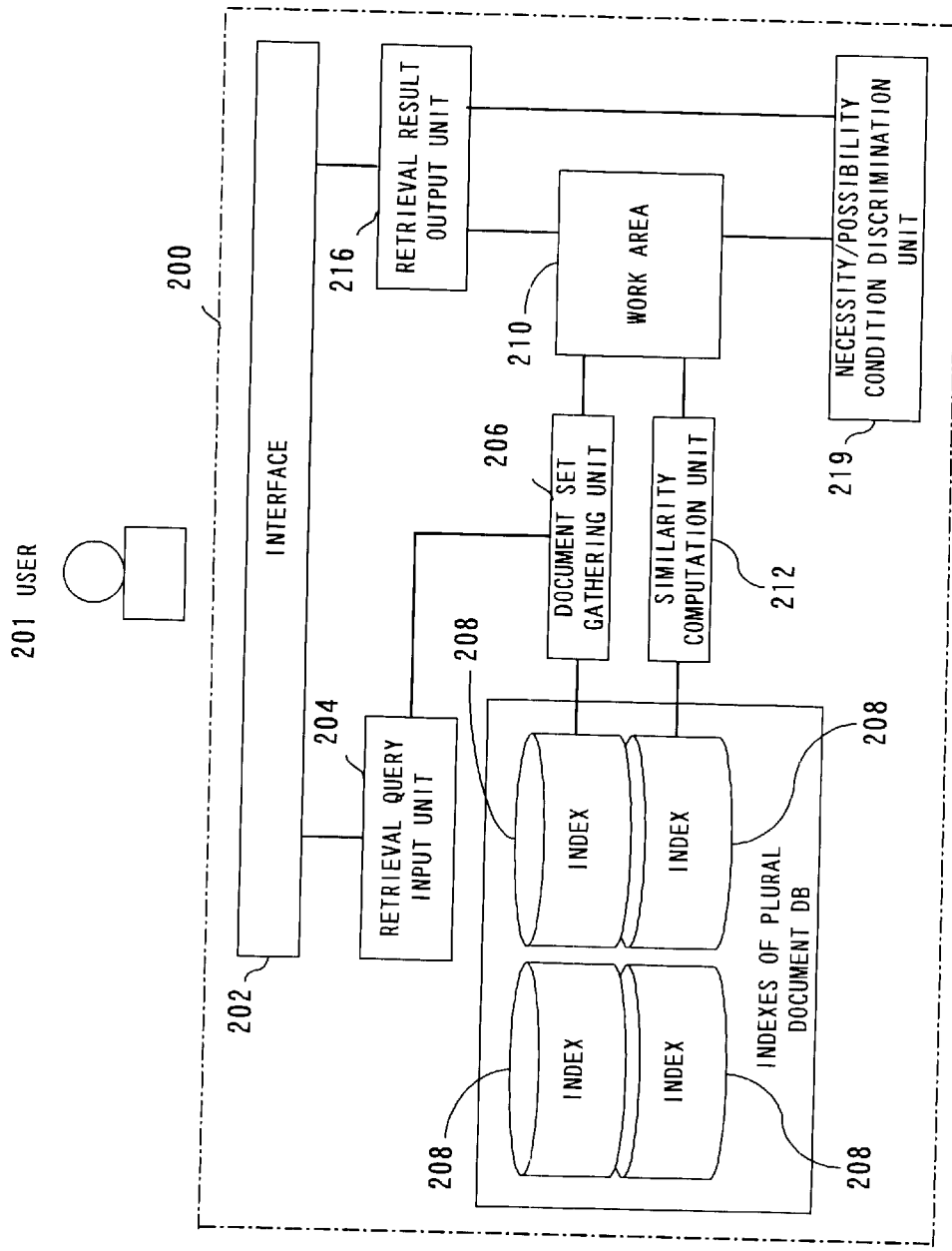
FIG. 7 is a block diagram of the configuration of the system of a plural document database retrieval device corresponding to the information retrieval device according to the second embodiment of the present invention.

Described below is a plural document database retrieval device (hereinafter referred to as a plural document DB retrieval device) 200 which is an information retrieval device according to the second embodiment of the present invention to which the principle of retrieving a plurality of document databases is applied. FIG. 7 is a block diagram of the configuration of the system of the plural document DB retrieval device 200. In FIG. 7, a plurality of document databases and a document management unit for managing the plurality of document databases are omitted.

The system configuration of the plural document DB retrieval device 200 is the same as the configuration of the information retrieval apparatus 100 shown in FIG. 3. However, since the plural document DB retrieval device 200 aims at retrieving a plurality of document databases (not shown in the attached drawings), an index 208 is provided for each document database. Therefore, it is different from the information retrieval apparatus 100 in that the number of indexes 208 is equal to the number of document databases, and the common keyword extraction unit 118 is replaced with a necessity/possibility condition discrimination unit 219.

In the plural document DB retrieval device 200 shown in FIG. 7, the components having the same names =as the components of the information retrieval apparatus 100, that is, an interface 202, a retrieval query input unit 204, a document set gathering unit 206, a work area 210, a similarity computation unit 212, and retrieval result output unit 216 have the functions of the retrieval query input unit 104, the document set gathering unit 106, the work area 110, the similarity computation unit 112, and the retrieval result output unit 116 respectively in the information retrieval apparatus 100.

Although not shown in FIG. 7, an index generation unit is provided in the plural document DB retrieval device 200 for a higher speed process as in the information retrieval apparatus 100. The index generation unit preliminarily (when the system is activated) retrieves a plurality of document databases through the document management unit, extracts a keyword from each document database, and generates the index 208. The index 208 also contains, in addition to the above described keyword, a total number of documents stored in each document database, the name and the identifier (document identifier of each document database), etc.

The interface 202 is an input device for inputting a retrieval query from a user 201, and an output device for outputting a retrieval result in the user perceivable mode.

The retrieval query input unit 204 receives from the interface 202 the retrieval query (a set of propositions) inputted by the user 201, and outputs it to the document set gathering unit 206.

The document set gathering unit 206 analyzes the retrieval query inputted from the retrieval query input unit 204, refers to the index 208 corresponding to each document database, and performs the process similar to the process of the document set gathering unit 206 on each document database. The document set gathering unit 206 counts the number of documents containing a true proposition in each document database, and writes the count value (number of documents having a true proposition) for each document database to the work area 210.

The similarity computation unit 212 computes the similarity of a document contained in each document database written to the work area 210, and writes to the work area 210 the similarity of the document contained for each document database. By evaluating the similarity information about each document database written to the work area 210, the document databases can be ranked and displayed in order from a higher similarity.

The retrieval result output unit 216 inputs the retrieval result from the necessity/possibility condition discrimination unit 219, and the user 201 outputs the retrieval result through the interface 202 in a perceivable mode for the user 201. When databases are individually retrieved, the similarity, written by the similarity computation unit 212 to the work area 210, of each document retrieved from the document database is referred to, each of the document in the document database is sorted in order from a higher similarity, and the ranking result of each document is output in a perceivable mode for the user 201 through the interface 202 based on the sorting result.

The details of the functions of the necessity/possibility condition discrimination unit 219 which is a component specific to the plural document DB retrieval device 200 are described later.

With the above described configuration, the plural document DB retrieval device 200 has the function of searching a plurality of document databases in addition to the function of searching one document database of the information retrieval apparatus 100. That is, it has the function of specifying which document database is a specialty document database required by the user, or a document database not a specialty document database, but a relevant document database, etc.

In addition, the plural document DB retrieval device 200 can be designed to have a component similar to the common keyword extraction unit 118 of the information retrieval apparatus 100. With this configuration, like the retrieval result output unit 116 of the information retrieval apparatus 100, the retrieval result output unit 216 can output a common keyword assigned a modal operator together with a retrieval result.

The operation of the plural document DB retrieval device 200 is described below by referring to the flowchart shown in FIG. 8. The flow of the basic process of the algorithm of the flowchart is as follows.

That is, the Boolean IR system or the non-Boolean IR system is used for each document database to obtain the number of documents having a true proposition according to the retrieval query. When the proposition according to the retrieval query is assigned to a necessity operator, the obtained number is compared with the total number of documents in the document database to determine whether or not the proposition is true in all documents in the document database (hereinafter referred to as 'necessity condition'). If the proposition according to the retrieval query is assigned to a possibility operator, then it is determined whether of not there is at least one document having a true proposition in a document database (referred to as possibility condition).

In the algorithm of the flowchart shown in FIG. 8, even when the user 201 inputs 'proposition assigned a possibility operator', '□ document database name' is output to notify the user 201 of a document database when there is the document database satisfying the 'necessity condition' (steps S47 and S48).

When the above described 'necessity condition' is too severe, the 'necessity condition' is converted into 'ratio of the number of documents having a true proposition to the total number of documents in a document database', or 'performing non-Boolean retrieval on each document database, and checking whether all documents ranking higher are all true', etc. Then, the changed 'necessity condition' is determined. The changing condition is preliminarily set. When the 'possibility condition' is too severe, the similar method can be applied.

When a retrieval result is displayed, a modal operator assigned to each proposition is basically added to the name of a document database (document database name) and is output. In this case, a document database not satisfying 'necessity condition' or 'possibility condition' is not displayed as a retrieval result. In addition, even a retrieval result of a proposition assigned the possibility ◇ has to be output with the necessity operator '□' added to the name of the document database (document database name) if there is a document database satisfying 'necessity condition'.

Next, the details of the flow of the above described process is described by referring to the flowchart shown in FIG. 8.

First, the 'possibility condition' and 'necessity condition' is set (step S41). Then, it is determined whether or not the retrieving process has been completed on all document databases (step S42). If the retrieving process has been completed on all document databases (YES in step S42), then the process terminates. If it has not been completed on all document databases (NO in step S42), then one of the non-retrieved document databases is selected, and a document having an input proposition as true is retrieved in the Boolean IR system or the non-Boolean IR system from the document database (step S43).

Next, it is determined whether or not the operator assigned to the input proposition is a necessity operator '□' or a possibility operator '◇' (step S44). If it is a necessity operator '□', then the necessity/possibility condition discrimination unit 219 determines whether or not the document database retrieved in step S43 satisfies 'necessity condition' based on the retrieval result in step S43 (step S45). When the necessity/possibility condition discrimination unit 219 determines that the 'necessity condition' is satisfied (YES in step S45), '□ document database name' is output (step S46) with the necessity operator '□' added to the name of the document database (document database name) (step S46), thereby returning control to step S42.

On the other hand, if it is determined in step S45 that the retrieved document database does not satisfy 'necessity condition' (NO in step S46), then control is immediately returned to step S42. In addition, if it is determined in step S44 that the operator of the above described proposition is a possibility operator '◇', then the necessity/possibility condition discrimination unit 219 determines whether or not the document database retrieved in step S43 satisfies 'necessity condition' based on the retrieval result in step S43 (step S47). If the necessity/possibility condition discrimination unit 219 determines that 'necessity condition' is satisfied, then '□ document database name' is output by adding the necessity operator □ to the name of the document database (document database name) (step S48), thereby returning control to step S42.

On the other hand, if it is determined in step S47 (NO in step S47) that 'necessity condition' is not satisfied, then the necessity/possibility condition discrimination unit 219 determines whether or not the document database retrieved in step S43 satisfies 'possibility condition' based on the retrieval result in step S43 (step S49).

If it is determined that 'possibility condition' is satisfied (YES in step S49), then '◇ document database name' is output (step S50) by adding a possibility operator ◇ to the name of the document database (document database name), thereby returning control to step S42.

On the other hand, if it is determined in step S49 that 'possibility condition' is not satisfied (NO in step S50), then control is immediately returned to step S42.

As described above, the processes in steps S43 through 50 are performed on all document databases in the system. When the processes in steps S43 through S50 are completed on all the document databases, it is determined in step S42 that the processes have been completed on all the document databases (YES in step S42), thereby terminating the process.

Then, a practical example of the process performed by the above described plural document DB retrieval device 200 executing the algorithm of the flowchart shown in FIG. 8 is described below.

For example, assume that the following four document databases 1 through 4 exist in the system.

1. 'chemical database': a chemical and compound specialty database containing a number of subjects on alcohol (100 subjects or more).

2. 'medical database': a medical and pharmaceutical specialty database containing some subjects on chemicals and alcohol (100 subjects or less).

3. 'liquor database': an alcoholic specialty database containing no subjects on compounds 4. 'car database': a car specialty database containing some subjects on compounds, but no subjects on alcohol.

When a proposition '□ compound' is inputted as a retrieval query, a specialty database about 'compound' is only 'chemical database'. Therefore, '□ chemical database' is output as a retrieval result in step S46.

In addition, when a proposition of '◇ compound' is inputted as a retrieval query, the document database containing the subject of 'compound' can be 'chemical database', 'medical database', and 'car database'. Since 'chemical database' is also a specialty database of 'compound', '□ chemical database' is output in step S48, and '◇ medical database' and '◇ car database' are output as retrieval results in step S50.

Described below is an example of the operation performed when '100 high-ranking subjects' is set as 'necessity condition'.

If a proposition of '◇ alcohol' is inputted as a retrieval query, and the above described 'necessity condition' is not set, then '◇ chemical database' and '◇ medical database' are output in step S48, and '□ liquor database' is output in step S48 as retrieval results. However, in this case, since '100 high-ranking subjects' is set as a necessity condition, and 'chemical database' satisfies the necessity condition, it is determined in step S47 that 'chemical database' satisfies the necessity condition. As a result, '◇ medical database' is output in step S50, and '□ chemical database' and '□ liquor database' are output in step S48 as retrieval results.

The necessity condition and the possibility condition can be specified by 'ratio of the number of hits in the document database'. For example, as described above, when the proposition of '◇ alcohol' is inputted as a retrieval query, and assuming that 'contained in a half or more of the documents in the document database' is preliminarily set as a necessity condition, output retrieval results depend on the number of documents in the chemical database. That is, if there are 200 or less documents in the chemical database, then the determination in step S47 is YES as a retrieval result of 'chemical database'. Therefore, '□ chemical database' is output in step S48. However, if the number of documents in the chemical database is larger than 200, the determination in step S47 is NO, and '◇ chemical database' is output in step S50.

Figure 9:
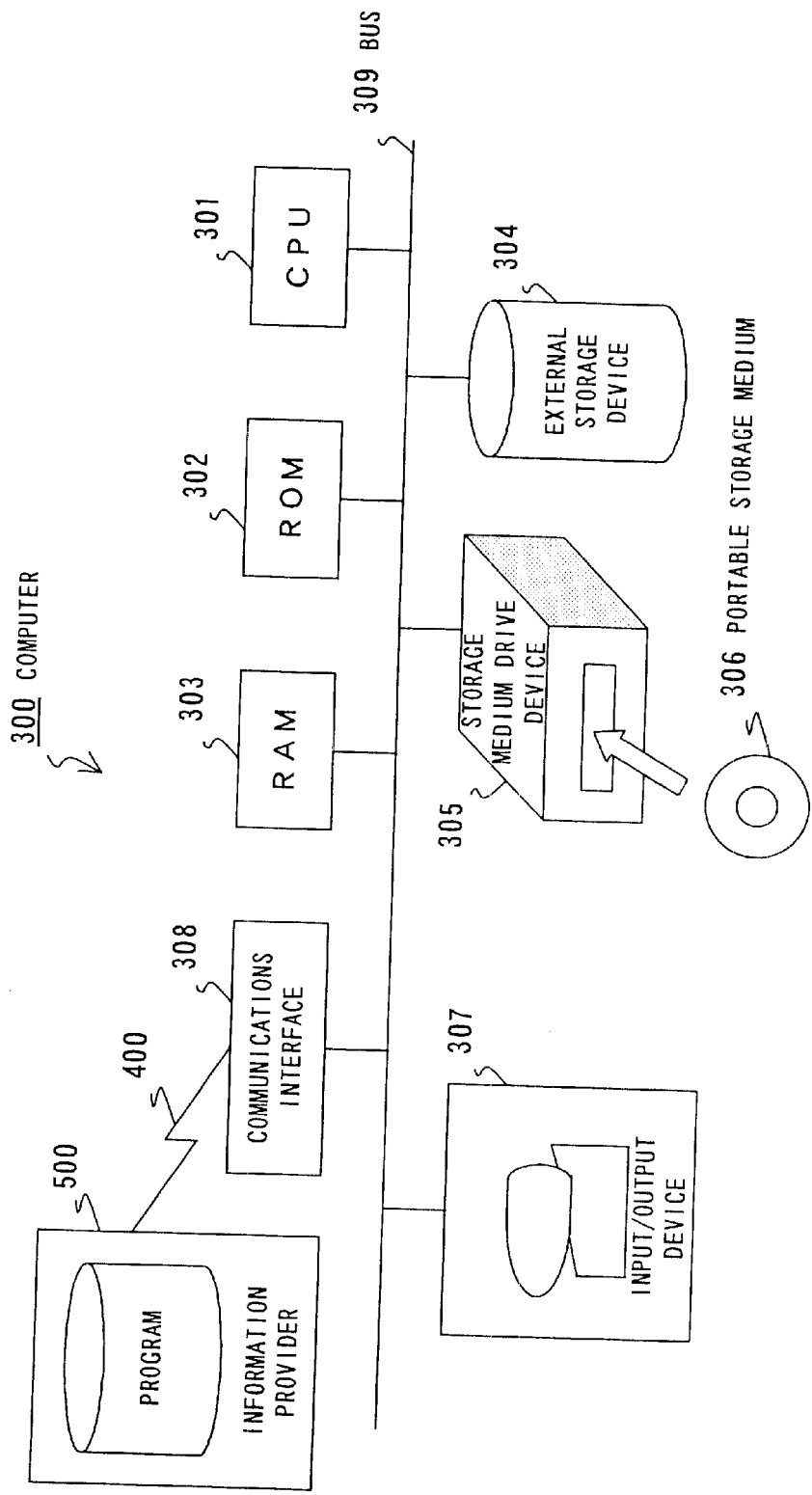
FIG. 9 is a block diagram of the configuration of the hardware of the computer realizing the first and second embodiments of the present invention.

FIG. 9 is a block diagram of the configuration of the hardware of a computer 300 realizing the function of each component according to the first and second embodiments of the present invention by executing a program.

The computer 300 comprises a CPU 301, ROM 302 RAM 303, an external storage device 304, a storage medium drive device 305, an input/output device 307, and a communications interface 308 each being connected to the CPU 301 through a bus 309.

The CPU 301 can access each of the above described components 302 through 308 through the bus 309 to control the entire system. The program realizing the algorithm of the embodiment of the present invention is stored in, for example, the ROM 302, the external storage device 304, or a portable storage medium 306.

The programs stored in the ROM 302 and the external storage device 304 are developed into programs executable by the CPU 301, and executed by the CPU 301. The program stored in the portable storage medium 306 is read by the storage medium drive device 305 by mounting the portable storage medium 306 to the storage medium drive device 305, developed into a format executable by the CPU 301 in the RAM 303, and is then executed by the CPU 301.

In addition, the above described program can be held by a information provider 500 connected to the computer 300 through a network 400. In this case, the communications interface 308 downloads the program held by the information provider 500 to the external storage device 304 through the network 400. Then, the program downloaded to the external storage device 304 is executed by the CPU 301 in the above described method.

The input/output device 307 can be an input device used when the users 101 and 201 input a retrieval query to the computer 300, and an output device used when the computer 300 outputs a retrieval result, a common keyword assigned a modal operator, etc. obtained by executing the program.

The external storage device 304 stores the document database 120 and a plurality of document databases. It also stores the indexes 108 and 208. The indexes 108 and 208 can also be stored in the RAM 303. The work areas 110 and 210, and the above described buffers, etc. are prepared in the RAM 303.

In addition, when the information provider 500 is provided with a computer executing the above described program and the document database 120 and/or a plurality of document databases, the above described program can be executed by a remote computer held by the information provider 500 through the communications interface 308 and the network 400 by the users 101 and 201 inputting a command to remotely execute the program from the input/output device 307. In this case, a common keyword assigned a retrieval result modal operator obtained by the computer held by the information provider 500, etc. can be received by the computer 300 through the network 400 and the communications interface 308. The received retrieval result is output from the input/output device 307 in the format perceivable by the users 101 and 201.

The portable storage medium 306 can be a floppy disk, CD-ROM, CD-RAM, various types of DVD, magneto-optical disk, phase changable optical disk, an IC card, etc. The external storage device 304 can be a hard disk, a disk array, etc. The input/output device 307 can be a keyword, a pointing device such as a mouse, etc., a CRT display, a thin display such as a liquid crystal display, a plasma display, an organic electro-luminescence display, etc.

In addition, the network 400 can be a LAN, a MAN, a WAN, or Internet, etc.

As described above, according to the present invention, a retrieval query having the describing function as the conventional Boolean IR system and the non-Boolean IR system, and capable of simplifying and representing the feeling of a user can be presented to the user by introducing a modal operator to the retrieval query. Thus, the user can easily represent his or her intention as a retrieval query without a heavy load required in the conventional technology.

In addition, a hierarchical level can be set in order of ranked documents by counting the true/false value of a proposition freely specified by a user and assigned a modal operator, and the ranking according to the true/false value can be evaluated independent of the normal ranking. Therefore, the user can easily specify the order in the ranking.

Furthermore, since a proposition having the necessity and/or possibility can be extracted from actually ranked documents, and the extraction result is displayed to the user, the user can compare the proposition inputted by the user with the proposition extracted from the actual retrieval result, check them and recognize a candidate for a proposition to be inputted next.

Additionally, when a plurality of document databases are searched, a specialty document database or a non-specialty but a relevant document database, etc. can be specified by evaluating the true/false value of a proposition assigned a necessity operator and/or a proposition assigned a possibility operator.

In addition, since a document database name assigned a necessity operator and/or a document database name assigned a possibility operator is output as a retrieval result, the user can immediately recognize (at one glance when a name is output on the display or as printed characters) whether the retrieved database is a specialty database or a relevant database.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An information retrieval apparatus retrieving a document corresponding to a retrieval query inputted by a user from a document database, comprising:
   an input unit inputting a retrieval query represented by a proposition assigned a modal operator used in a modal logic;
   a document set gathering unit searching a document database and gathering a set of documents having true proposition of the retrieval query;
   a similarity computation unit computing a similarity of the gathered set of documents; and
   a retrieval result output unit hierarchically ranking and outputting a set of documents corresponding to the inputted retrieval query based on a gathering result of said document set gathering unit and a computation result of said similarity computation unit.

2. The apparatus according to claim 1, wherein
   said retrieval result output unit determines a hierarchical level of the set of documents for the proposition in the inputted retrieval query based on a number of true propositions and a number of false propositions as an evaluation reference.

3. The apparatus according to claim 2, wherein
   said retrieval result output unit counts a value obtained by subtracting the number of false propositions from the number of true propositions for each set of documents, and arranges a set of documents having a larger count value at a higher hierarchical level, and a set of documents having a smaller count value at a lower hierarchical level.

4. The apparatus according to claim 2, wherein
   said retrieval result output unit ranks plural sets of documents arranged at an equal hierarchical level in order from a higher similarity.

5. The apparatus according to claim 1, further comprising:
   a common keyword extraction unit extracting a keyword common among documents in each set of documents ranked by said retrieval result output unit.

6. The apparatus according to claim 5, wherein:
   said common keyword extraction unit extracts a keyword contained commonly in all documents in each set of documents; and
   said retrieval result output unit outputs a keyword after adding a necessity operator to the keyword.

7. The apparatus according to claim 5, wherein
   said common keyword extraction unit extracts a keyword contained commonly in documents of only ranking higher order in each set of documents, and
   said retrieval result output unit outputs the keyword after adding a possibility operator to the keyword.

8. The apparatus according to claim 5, wherein
   said common keyword extraction unit extracts a keyword contained commonly in documents of only ranking lower order in each set of documents; and
   said retrieval result output unit outputs the keyword after adding a possibility operator and a negation operator to the keyword.

9. An information retrieval apparatus retrieving a document database corresponding to a retrieval query inputted by a user from a plurality of document databases, comprising:
   an input unit inputting a retrieval query represented by a proposition assigned a modal operator used in a modal logic;
   a document set gathering unit searching a plurality of document databases and gathering a set of documents having true proposition of the retrieval query; and
   a necessity/possibility condition discrimination unit discriminating a document database satisfying a condition prescribed by a modal operator added to the proposition based on a gathering result obtained from said document set gathering unit.

10. The apparatus according to claim 9, further comprising:
    a retrieval result output unit outputting a name of the document database determined as satisfying the condition by said necessity/possibility condition discrimination unit after adding a modal operator to the name.

11. The apparatus according to claim 9, wherein the name. said necessity/possibility condition discrimination unit determines a document database satisfying a necessity condition in which the proposition is true in all stored documents if the modal operator added to the proposition is a necessity operator.

12. The apparatus according to claim 11, further comprising:
    a retrieval result output unit outputting a name of the document database determined as satisfying the necessity condition by said necessity/possibility condition discrimination unit after adding a necessity operator to the name.

13. The apparatus according to claim 9, wherein
    said necessity/possibility condition discrimination unit determines a document database satisfying a possibility condition in which the proposition is true in at least one of stored documents if the modal operator added to the proposition is a possibility operator.

14. The apparatus according to claim 13, further comprising:
    a retrieval result output unit outputting a name of a document database determined as satisfying the possibility condition by said necessity/possibility condition discrimination unit after adding a possibility operator to the name.

15. The apparatus according to claim 13, wherein
    said necessity/possibility condition discrimination unit determines a document database satisfying a necessity condition in which the proposition is true in all stored documents although the modal operator added to the proposition is a possibility operator.

16. The apparatus according to claim 15, further comprising:
    a retrieval result output unit outputting a name of the document database determined as satisfying the necessity condition by said necessity/possibility condition discrimination unit after adding a necessity operator to the name.

17. An information retrieval method for retrieving a document corresponding to a retrieval query inputted by a user from a document database, comprising:
    (a) inputting a retrieval query represented by a proposition assigned a modal operator used in a modal logic;

(b) searching a document database and gathering a set of documents having true proposition of the retrieval query;

(c) computing a similarity of the gathered set of documents; and (d) hierarchically ranking and outputting a set of documents corresponding to the inputted retrieval query based on a gathering result of the document set and a computation result of the similarity.

18. The method according to claim 17, wherein in said (d), a hierarchical level of the set of documents is determined for the proposition in the inputted retrieval query based on a number of true propositions and a number of false propositions as an evaluation reference.

19. The method according to claim 18, wherein in said (d), a value obtained by subtracting the number of false propositions from the number of true propositions is computed for each set of documents, and a set of documents having a larger count value is arranged at a higher hierarchical level, and a set of documents having a smaller count value is arranged at a lower hierarchical level.

20. The method according to claim 18, wherein in said (d), plural sets of documents arranged at an equal hierarchical level are arranged in order from a higher similarity.

21. The method according to claim 17, further comprising:

(e) extracting a keyword common among documents in each set of document ranked in said (d).

22. The method according to claim 21, wherein:

in said (e), a keyword contained commonly in all documents in each set of documents is extracted; and in said (d), the keyword is output after being assigned a necessity operator.

23. The method according to claim 21, wherein in said (e), a keyword contained commonly in documents only ranking higher in each set of documents is extracted, and in said (d), said keyword is output after being assigned a possibility operator.

24. The method according to claim 21, wherein in said (e), a keyword contained commonly in documents only ranking lower in each set of documents is extracted; and in said (d), the keyword is output after being assigned a possibility operator and a negation operator.

25. An information retrieval method for retrieving a document database corresponding to a retrieval query inputted by a user from a plurality of document databases, comprising:

(a) inputting a retrieval query represented by a proposition assigned a modal operator used in a modal logic;

(b) searching a plurality of document databases and gathering a set of documents having true proposition of the retrieval query; and (c) discriminating a document database satisfying a condition prescribed by a modal operator added to the proposition based on a gathering result obtained in said (b).

26. The method according to claim 25, further comprising:

(d) outputting a name of a document database determined as satisfying the condition in said (c) after adding a modal operator to the name.

27. The method according to claim 25, wherein in said (c), a document database satisfying a necessity condition in which the proposition is true in all stored documents is determined if the modal operator added to the proposition is a necessity operator.

28. The method according to claim 27, further comprising:

(d1) outputting a name of a document database determined as satisfying the necessity condition in said (c) after adding a necessity operator to the name.

29. The method according to claim 25, wherein in said (c), a document database satisfying a possibility condition in which the proposition is true in at least one of stored documents is determined if the modal operator added to the proposition is a possibility operator.

30. The method according to claim 29, further comprising:

(d2) outputting a name of a document database determined as satisfying the possibility condition in said (c) after adding a possibility operator to the name.

31. The method according to claim 29, wherein in said (c), a document database satisfying a necessity condition in which the proposition is true in all stored documents is determined although the modal operator added to the proposition is a possibility operator.

32. The method according to claim 31, further comprising:

(d3) outputting a name of a document database determined as satisfying the necessity condition in said (c) after adding a necessity operator to the name.

33. A computer-readable storage medium storing a program used to direct a computer to perform:

(a) inputting a retrieval query represented by a proposition assigned a modal operator used in a modal logic;

(b) searching a document database and gathering a set of documents having true proposition of the retrieval query;

(c) computing a similarity of the gathered set of documents; and (d) hierarchically ranking and outputting a set of documents corresponding to the inputted retrieval query based on a gathering result of the document set and a computation result of the similarity.

34. The storage medium according to claim 33, wherein said program directs said computer to perform, in said (d), a process of determining a hierarchical level of the set of documents for the proposition in the inputted retrieval query based on a number of true propositions and a number of false propositions as an evaluation reference.

35. The storage medium according to claim 34, wherein said program directs said computer to compute, in said (d), a value obtained by subtracting the number of false propositions from the number of true propositions for each set of documents, and arrange a set of documents having a larger count value at a higher hierarchical level, and a set of documents having a smaller count value at a lower hierarchical level.

36. The storage medium according to claim 34, wherein said program directs said computer to rank, in said (d), plural sets of documents arranged at an equal hierarchical level in order from a higher similarity.

37. The storage medium according to claim 33, wherein said program further directs said computer to perform (e) extracting a keyword common among documents in each set of documents ranked in said (d).

38. The storage medium according to claim 37, wherein:

said program directs said computer to extract, in said (e), a keyword contained commonly in all documents in each set of documents; and said program directs said computer to output, in said (d), the keyword after assigning a necessity operator to the keyword.

39. The storage medium according to claim 38, wherein said program directs said computer to extract, in said (e), a keyword contained commonly in documents only ranking higher in each set of documents; and said program directs said computer to output, in said (d), said keyword after assigning a possibility operator to the keyword.

40. The storage medium according to claim 37, wherein said program directs said computer to extract, in said (e), a keyword contained commonly in documents only ranking lower in each set of documents; and said program directs said computer to output, in said (d), the keyword after assigning a possibility operator and a negation operator to the keyword.

41. A computer-readable storage medium storing a program used to direct a computer to perform:

(a) inputting a retrieval query represented by a proposition assigned a modal operator used in a modal logic;

(b) searching a plurality of document databases and gathering a set of documents having true proposition of the retrieval query; and (c) discriminating a document database satisfying a condition prescribed by a modal operator added to the proposition based on a gathering result obtained in said (b).

42. The storage medium according to claim 41, wherein said program further direct said computer to perform (d) outputting a name of a document database determined as satisfying the condition in said (c) after adding a modal operator to the name.

43. The storage medium according to claim 41, wherein said program directs said computer to determine, in said (c), a document database satisfying a necessity condition in which the proposition is true in all stored documents if the modal operator added to the proposition is a necessity operator.

44. The storage medium according to claim 41, wherein said program directs said computer to perform (d1) outputting a name of a document database determined as satisfying the necessity condition in said (c) after adding a necessity operator to the name.

45. The storage medium according to claim 41, wherein said program directs said computer to determine, in said (c), a document database satisfying a possibility condition in which the proposition is true in at least one of stored documents if the modal operator added to the proposition is a possibility operator.

46. The storage medium according to claim 45, wherein said program directs said computer to perform (d2) outputting a name of a document database determined as satisfying the possibility condition in said (c) after adding a possibility operator to the name.

47. The storage medium according to claim 41, wherein said program further directs said computer to determine, in said (c), a document database satisfying a necessity condition in which the proposition is true in all stored documents although the modal operator added to the proposition is a possibility operator.

48. The storage medium according to claim 47, said program further directs said computer to perform (d3) outputting a name of a document database determined as satisfying the necessity condition in said (c) after adding a necessity operator to the name.

49. An information retrieval apparatus retrieving a document corresponding to a retrieval query inputted by a user from a document database, comprising:

input means for inputting a retrieval query represented by a proposition assigned a modal operator used in a modal logic;

document set gathering means for searching a document database and gathering a set of documents having true proposition of the retrieval query;

similarity computation means for computing a similarity of the gathered set of documents; and retrieval result output means for hierarchically ranking and outputting a set of documents corresponding to the inputted retrieval query based on a gathering result of said document set gathering means and a computation result of said similarity computation means.

50. The apparatus according to claim 49, further comprising:

common keyword extraction means for extracting a keyword common among documents in each set of documents ranked by said retrieval result output means.

51. An information retrieval apparatus retrieving a document database corresponding to a retrieval query inputted by a user from a plurality of document databases, comprising:

input means for inputting a retrieval query represented by a proposition assigned a modal operator used in a modal logic;

document set gathering means for searching a plurality of document databases and gathering a set of documents having true proposition of the retrieval query; and necessity/possibility condition discrimination means for discriminating a document database satisfying a condition prescribed by a modal operator added to the proposition based on a gathering result obtained from said document set gathering means.

52. The Apparatus according to claim 51, further comprising:

retrieval result output means for outputting a name of a document database determined as satisfying the condition by said necessity/possibility condition discrimination means after adding a modal to the name.

* * * * *

UNITED STATES PATENT AND TRADEMARK OFFICE
CERTIFICATE OF CORRECTION

PATENT NO. : 6,499,030 B1
DATED : December 24, 2002
INVENTOR(S) : Nobuyika Igata It is certified that error appears in the above-identified patent and that said Letters Patent is hereby corrected as shown below:

<u>Column 26,</u>
Line 24, delete "the name."
Line 25, begin a new paragraph with "said"

Signed and Sealed this

Twenty-fifth Day of March, 2003

JAMES E. ROGAN
*Director of the United States Patent and Trademark Office*